United States Patent
Jensen et al.

(10) Patent No.: US 12,353,575 B2
(45) Date of Patent: *Jul. 8, 2025

(54) 3RD PARTY APPLICATION MANAGEMENT

(71) Applicant: Snap Inc., Santa Monica, CA (US)

(72) Inventors: John Jensen, Santa Monica, CA (US); Dylan Shane Eirinberg, Venice, CA (US); Alexander R. Osborne, Los Angeles, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,793

(22) Filed: Oct. 28, 2022

(65) Prior Publication Data

US 2023/0153131 A1  May 18, 2023

Related U.S. Application Data

(63) Continuation of application No. 17/301,631, filed on Apr. 9, 2021, now Pat. No. 11,599,371, which is a
(Continued)

(51) Int. Cl.
*G06F 21/62* (2013.01)
*G06F 3/048* (2013.01)
(Continued)

(52) U.S. Cl.
CPC .............. *G06F 21/62* (2013.01); *G06F 3/048* (2013.01); *G06F 9/451* (2018.02); *G06F 16/70* (2019.01);
(Continued)

(58) Field of Classification Search
CPC .......... G06F 9/451; G06F 3/048; G06F 16/70; H04L 51/046; H04L 67/02; H04L 67/53;
(Continued)

(56) References Cited

U.S. PATENT DOCUMENTS 9,865,005 B1     1/2018  Pottjegort
11,023,261 B1 *  6/2021  Jensen ................. H04L 51/046
(Continued)

FOREIGN PATENT DOCUMENTS

CN     106649446 A    5/2017
CN     113383336 A    9/2021
(Continued)

OTHER PUBLICATIONS

"U.S. Appl. No. 16/236,088, Advisory Action mailed Nov. 18, 2020", 3 pgs.
(Continued)

*Primary Examiner* — Roberto Borja
(74) *Attorney, Agent, or Firm* — Schwegman Lundberg & Woessner, P.A.

(57) ABSTRACT

Methods and systems for secure applications running web view applications are disclosed. In some aspects, user data may be secured within a first security domain, that is inaccessible to a web view application running within a second application. The second application accesses the user data via a second security domain, when a request is received from the web view application to display a user interface. The second application then displays a user interface based at least in part, on the user data.

19 Claims, 18 Drawing Sheets

Related U.S. Application Data continuation of application No. 16/236,088, filed on Dec. 28, 2018, now Pat. No. 11,023,261.

(51) Int. Cl.
| | |
|---|---|
| *G06F 9/451* | (2018.01) |
| *G06F 16/70* | (2019.01) |
| *H04L 51/00* | (2022.01) |
| *H04L 51/046* | (2022.01) |
| *H04L 51/52* | (2022.01) |
| *H04L 67/02* | (2022.01) |
| *H04L 67/50* | (2022.01) |
| *H04L 67/53* | (2022.01) |
| *H04M 1/72436* | (2021.01) |
| *H04N 1/00* | (2006.01) |
| *G06Q 30/02* | (2023.01) |
| *H04L 51/04* | (2022.01) |

(52) U.S. Cl.
CPC ............ *H04L 51/046* (2013.01); *H04L 67/02* (2013.01); *H04L 67/53* (2022.05); *H04L 67/535* (2022.05); *H04N 1/00501* (2013.01); *G06Q 30/02* (2013.01); *H04L 51/00* (2013.01); *H04L 51/04* (2013.01); *H04L 51/52* (2022.05); *H04M 1/72436* (2021.01)

(58) Field of Classification Search
CPC ....... H04L 67/535; H04L 51/00; H04L 51/04; H04L 51/52; H04N 1/00501; H04M 1/72436

See application file for complete search history.

(56) References Cited

U.S. PATENT DOCUMENTS

| | | | | |
|---|---|---|---|---|
| 11,599,371 | B2* | 3/2023 | Jensen | H04N 1/00501 |
| 2006/0256133 | A1* | 11/2006 | Rosenberg | G06F 3/013 345/619 |
| 2007/0150355 | A1 | 6/2007 | Meggs | |
| 2008/0066107 | A1 | 3/2008 | Moonka et al. | |
| 2008/0168099 | A1 | 7/2008 | Skaf | |
| 2009/0070219 | A1* | 3/2009 | D'Angelo | G06Q 30/0247 705/37 |
| 2009/0100505 | A1 | 4/2009 | Shaty | |
| 2010/0041422 | A1 | 2/2010 | Wormald et al. | |
| 2013/0013408 | A1 | 1/2013 | Hjelm et al. | |
| 2013/0227675 | A1 | 8/2013 | Fujioka | |
| 2013/0340028 | A1 | 12/2013 | Rajagopal et al. | |
| 2014/0108252 | A1* | 4/2014 | Itwaru | G06Q 20/3276 705/44 |
| 2014/0164951 | A1* | 6/2014 | Gupta | G06F 3/048 715/753 |
| 2015/0026708 | A1* | 1/2015 | Ahmed | H04N 21/812 725/12 |
| 2015/0039406 | A1 | 2/2015 | Dubey et al. | |
| 2015/0052036 | A1 | 2/2015 | Vernal et al. | |
| 2015/0058923 | A1* | 2/2015 | Rajagopal | G06F 21/36 726/1 |
| 2015/0067714 | A1* | 3/2015 | Bhogal | H04N 21/4532 725/25 |
| 2015/0352436 | A1* | 12/2015 | Pieron | A63F 13/45 463/25 |
| 2015/0370331 | A1 | 12/2015 | Gonzales, Jr. | |
| 2016/0055532 | A1* | 2/2016 | Connolly | G06F 16/54 705/14.55 |
| 2016/0162555 | A1 | 6/2016 | Shapira | |
| 2016/0283984 | A1* | 9/2016 | Rabbat | G06Q 30/0269 |
| 2017/0061483 | A1* | 3/2017 | Cheng | G06Q 30/0207 |
| 2017/0154354 | A1* | 6/2017 | Kim | G06Q 30/02 |
| 2017/0187813 | A1* | 6/2017 | Li | G06F 16/9536 |
| 2017/0193117 | A1 | 7/2017 | Reigen et al. | |
| 2017/0270551 | A1 | 9/2017 | Chen et al. | |
| 2017/0372348 | A1* | 12/2017 | Baluja | G06Q 30/0243 |
| 2018/0267753 | A1* | 9/2018 | Asakimori | G06F 3/1298 |
| 2019/0012602 | A1 | 1/2019 | Mishra et al. | |
| 2019/0306215 | A1* | 10/2019 | Bastide | H04L 65/612 |
| 2020/0089811 | A1 | 3/2020 | Liu et al. | |
| 2021/0224086 | A1 | 7/2021 | Jensen et al. | |
| 2021/0365980 | A1* | 11/2021 | Hain | G06F 9/44526 |

FOREIGN PATENT DOCUMENTS

| | | |
|---|---|---|
| DE | 202014100555 U1 | 5/2015 |
| EP | 3903216 B1 | 7/2023 |
| KR | 102537852 B1 | 5/2023 |
| WO | WO-2020140045 A1 | 7/2020 |

OTHER PUBLICATIONS

"U.S. Appl. No. 16/236,088, Examiner Interview Summary mailed Jun. 29, 2020", 3 pgs.

"U.S. Appl. No. 16/236,088, Final Office Action mailed Sep. 9, 2020", 42 pgs.

"U.S. Appl. No. 16/236,088, Non Final Office Action mailed Apr. 15, 2020", 30 pgs.

"U.S. Appl. No. 16/236,088, Notice of Allowance mailed Dec. 24, 2020", 16 pgs.

"U.S. Appl. No. 16/236,088, Response filed Jun. 30, 2020 to Non Final Office Action mailed Apr. 15, 2020", 9 pgs.

"U.S. Appl. No. 16/236,088, Response filed Nov. 6, 2020 to Final Office Action mailed Sep. 9, 2020", 11 pgs.

"U.S. Appl. No. 17/301,631, Non Final Office Action mailed Feb. 28, 2022", 47 pgs.

"U.S. Appl. No. 17/301,631, Notice of Allowability mailed Aug. 17, 2022", 11 pgs.

"U.S. Appl. No. 17/301,631, Notice of Allowance mailed Jul. 28, 2022", 16 pgs.

"U.S. Appl. No. 17/301,631, Response filed May 27, 2022 to Non Final Office Action mailed Feb. 28, 2022", 12 pgs.

"European Application Serial No. 19843046.4, Response filed Feb. 14, 2022 to Communication Pursuant to Rules 161 and 162 EPC mailed Aug. 4, 2021", 20 pgs.

"International Application Serial No. PCT/US2019/068761, International Preliminary Report on Patentability mailed Jul. 8, 2021", 7 pgs.

"International Application Serial No. PCT/US2019/068761, International Search Report mailed Mar. 25, 2020", 4 pgs.

"International Application Serial No. PCT/US2019/068761, Written Opinion mailed Mar. 25, 2020", 5 pgs.

"Korean Application Serial No. 10-2021-7023516, Notice of Preliminary Rejection mailed Sep. 16, 2022", w/ English Translation, 4 pgs.

"Chinese Application Serial No. 201980086279.0, Office Action mailed Aug. 29, 2024", w/ English Translation, 16 pgs.

"Chinese Application Serial No. 201980086279.0, Response filed Dec. 18, 2024 to Office Action mailed Aug. 29, 2024", W/O English Claims, 9 pgs.

"Chinese Application Serial No. 201980086279.0, Office Action mailed Jan. 25, 2025", w/ English Translation, 16 pgs.

"Chinese Application Serial No. 201980086279.0, Response filed Mar. 24, 2025 to Office Action mailed Jan. 25, 2025", W/English Claims, 15 pgs.

\* cited by examiner

3RD PARTY APPLICATION MANAGEMENT

CLAIM OF PRIORITY

This application is a continuation of U.S. patent application Ser. No. 17/301,631, filed on Apr. 9, 2021, which is a continuation of U.S. patent application Ser. No. 16/236,088, filed on Dec. 28, 2018, now issued as U.S. Pat. No. 11,023,261, each of which are incorporated herein by reference in their entireties.

TECHNICAL FIELD

The present disclosure generally relates to the technical field of virtual currency. In particular, the disclosed embodiments provide for virtual currency within a social network.

BACKGROUND

Social networking applications support a broad array of features, which continues to expand. Some of these features include the ability to integrate third party applications into the social networking framework. While 3$^{rd}$ party applications can augment social network functionality in important ways, user data segmentation is often of significant importance.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
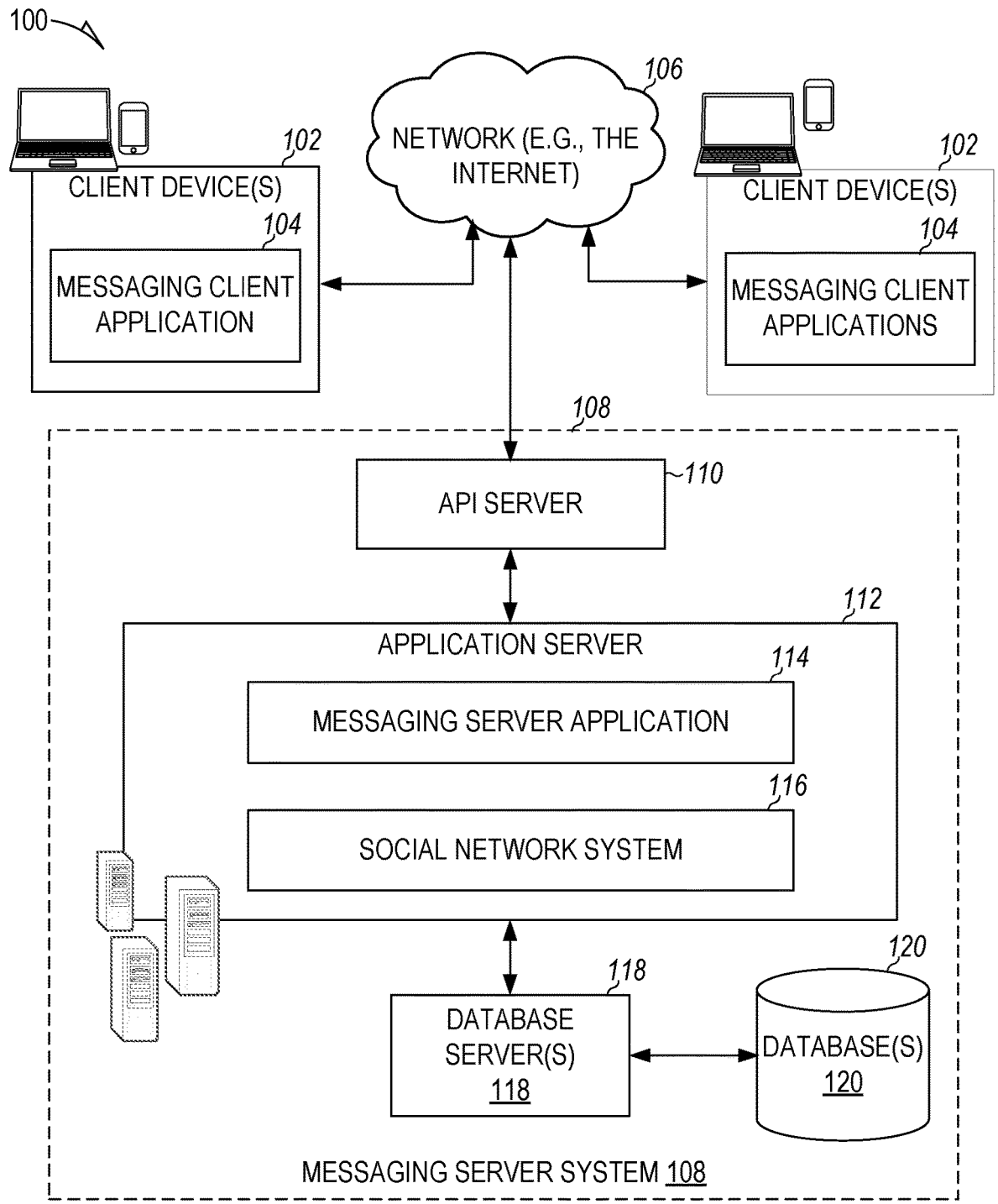
FIG. 1 is a block diagram showing an example messaging system for exchanging data (e.g., messages and associated content) over a network, according to some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Disclosed are embodiments that provide for launching and running third party applications within a web view. The web view may be implemented via a browser application embedded within a social networking application. To restrict access to user data available to the social networking application, the web view may be run in a separate security domain from the social network application per se. In some aspects, a webview application is bundled inside a mobile device application. Use of a webview application may allow a mobile application to be build using web based technologies, such as one or more of HTML, JavaScript, CSS, etc.) The webview application may be bundled within an application that runs natively on a mobile device operating system.

Certain user interfaces may only be accessible from the social networking application, and not via the web view. For example, if a user interface needs to access user data in order to perform its function, it will be unable to do this from the web view, and may need to rely on the social networking application to display this user interface on its behalf. In some embodiments, the web view may also be configured in a security domain that prevents access to financial information, such as virtual currency balance information (e.g. token balance), a store providing for selling or buying virtual currency (token shop). Additionally, dialogs confirming financial transactions may also be made unavailable to the web view application. Thus, the social network application may display confirmation dialogs before performing any financial transactions on behalf of the web view application.

To facilitate this, the web view application may generate a request to display a user interface. The request is provided to the social network application. The request may indicate one or more parameters for selecting an appropriate user interface to display. For example, the request may specify a particular type of user interface to display, and other criterion. The other criterion may relate to, for example, characteristics of the user interface to be displayed. For example, the request may indicate a video should be displayed, or an image, or other type of content.

The social network application then accesses user data as necessary to complete the request. For example, selecting a user interface to display may include matching available user interfaces to display with one or more characteristics of the user to which the user interface will be displayed. Selecting the user interface may also include selecting a user interface that is in accordance with parameters provided by the web view application.

While the user interface is displayed, input received to the user interface is monitored. For example, the user interface may be monitored to determine whether a user is engaged with the user interface, whether the user interface was canceled, whether portions of the user interface were skipped by the user, whether the user interface was made a background window, or lost focus while it was being displayed, or other indications of the user's engagement with the user interface.

The display of the user interface may determine how virtual currency is allocated to a user account. For example, each user interface available for display may be associated with a specific amount of virtual currency that can be credited to an account displaying the user interface. Depending on the results of a display of the user interface, a portion or all of the specific amount may be credited. For example, if a user watches 40% of a video, 40% of the virtual currency available may be credited to the user's account.

Thus, by delegating the display of user interfaces to a social networking application, a web based application running within a web view may be maintained with a security domain that restricts access to user data. This provides for a more secure computing environment, especially when those web based applications are developed by third parties, who's technical skill and/or motives are not guaranteed to ensure the security of said user data.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
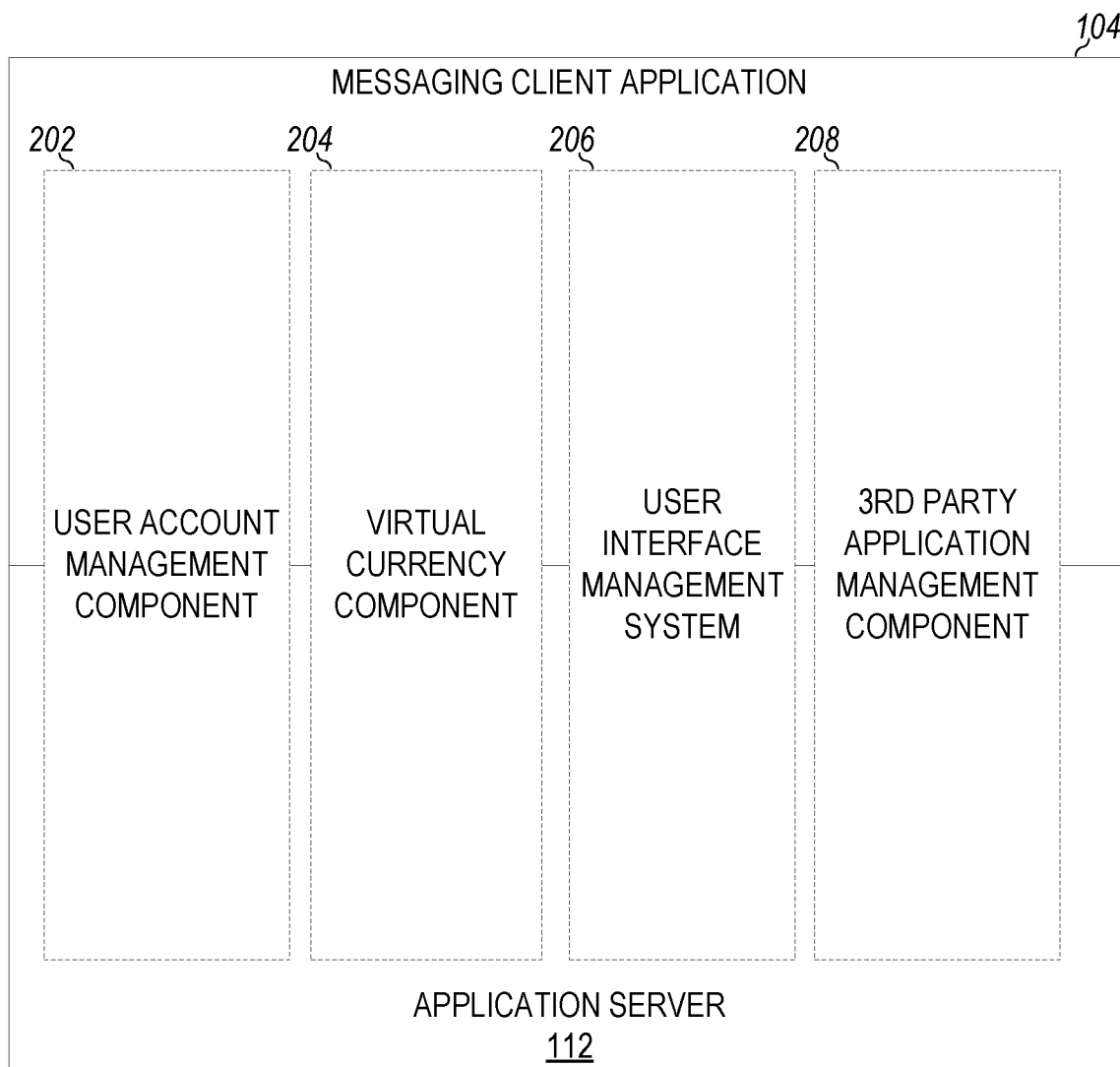
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely a user account management component 202, virtual currency component 204, user interface management component 206, and a $3^{rd}$ party application management component 208.

The user account management component 202 manages user account for the social network system 116. For example, the user account management component 202 may maintain authentication credentials for each user account maintained by the social network system 116. The user account management component 202 may also establish sessions based on authentication credentials provided by a client device. The session may provide access to resources, such as user data, content or access to other users on the social network, based on a successful authentication.

The virtual currency component 204 manages virtual currency within the social network system. For example, the virtual currency component 204 may allocate an amount of virtual currency to one or more user accounts. The virtual currency component 204 may manage currency balances within user accounts. For example, when certain actions are performed by a user account, a virtual currency of the user account may be increased or decreased, depending on the action.

The user interface management component 206 manages user interfaces presented by the messaging client application 104. In some aspects, a user interface of messaging client application 104 may be invoked based on a request from a $3^{rd}$ party application, such as a third party application running in a browser. The browser may be bundled within the messaging client application 104 in some aspects, for example, as a web view. Thus, there may be a need to manage user interfaces displayed within the web view and user interfaces displayed by the messaging client application 104.

The $3^{rd}$ party application management component 208 manages third party applications that may run as a bundled application within a browser included in the messaging client application 104. For example, a bundled application may generate one or more requests for functionality from the messaging client application 104. The $3^{rd}$ party application management component 208 may service these requests, and provide data to the $3^{rd}$ party application as appropriate for its respective function.

Figure 3:
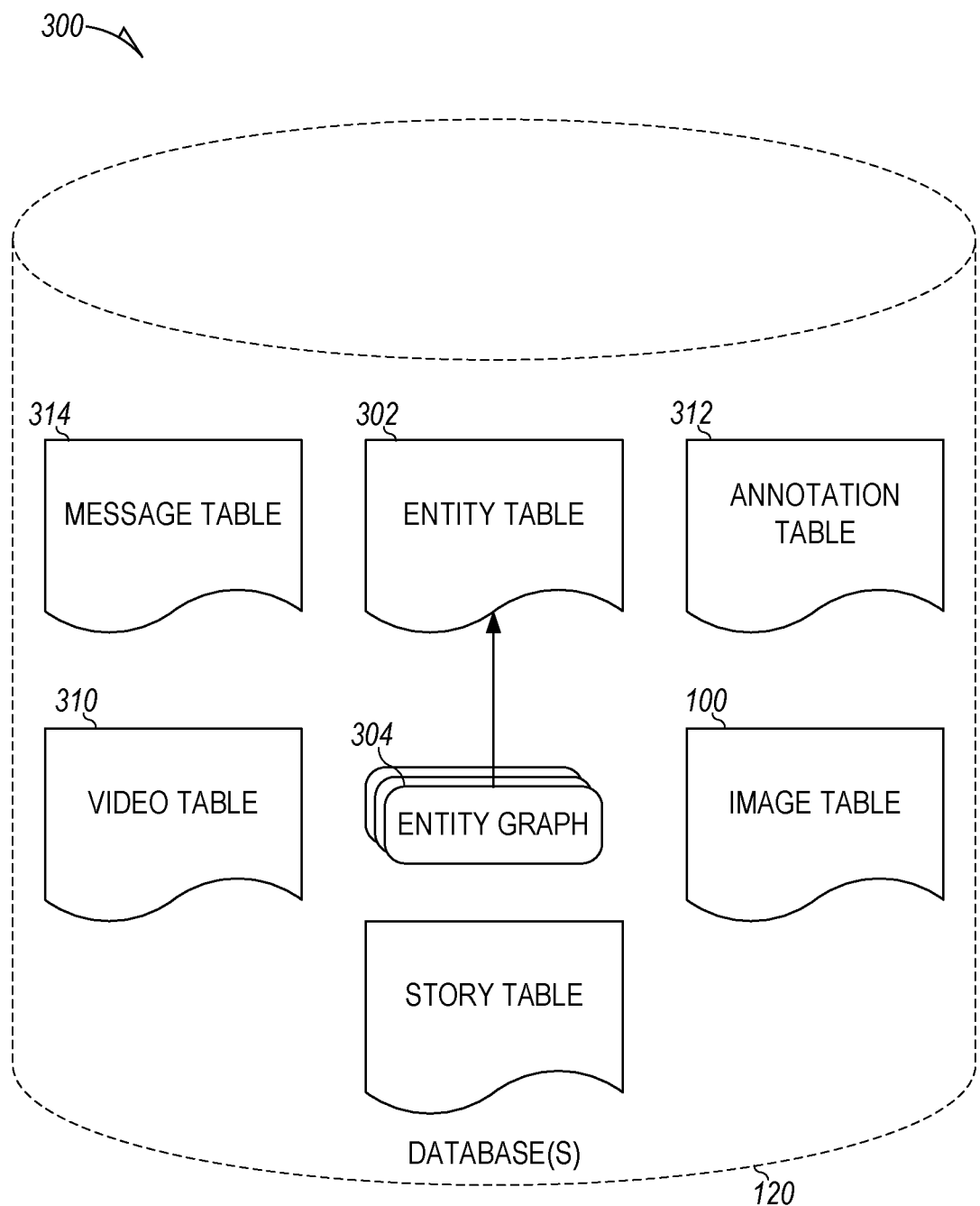
FIG. 3 is a schematic diagram illustrating data which may be stored in a database of the messaging system, according to some embodiments.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
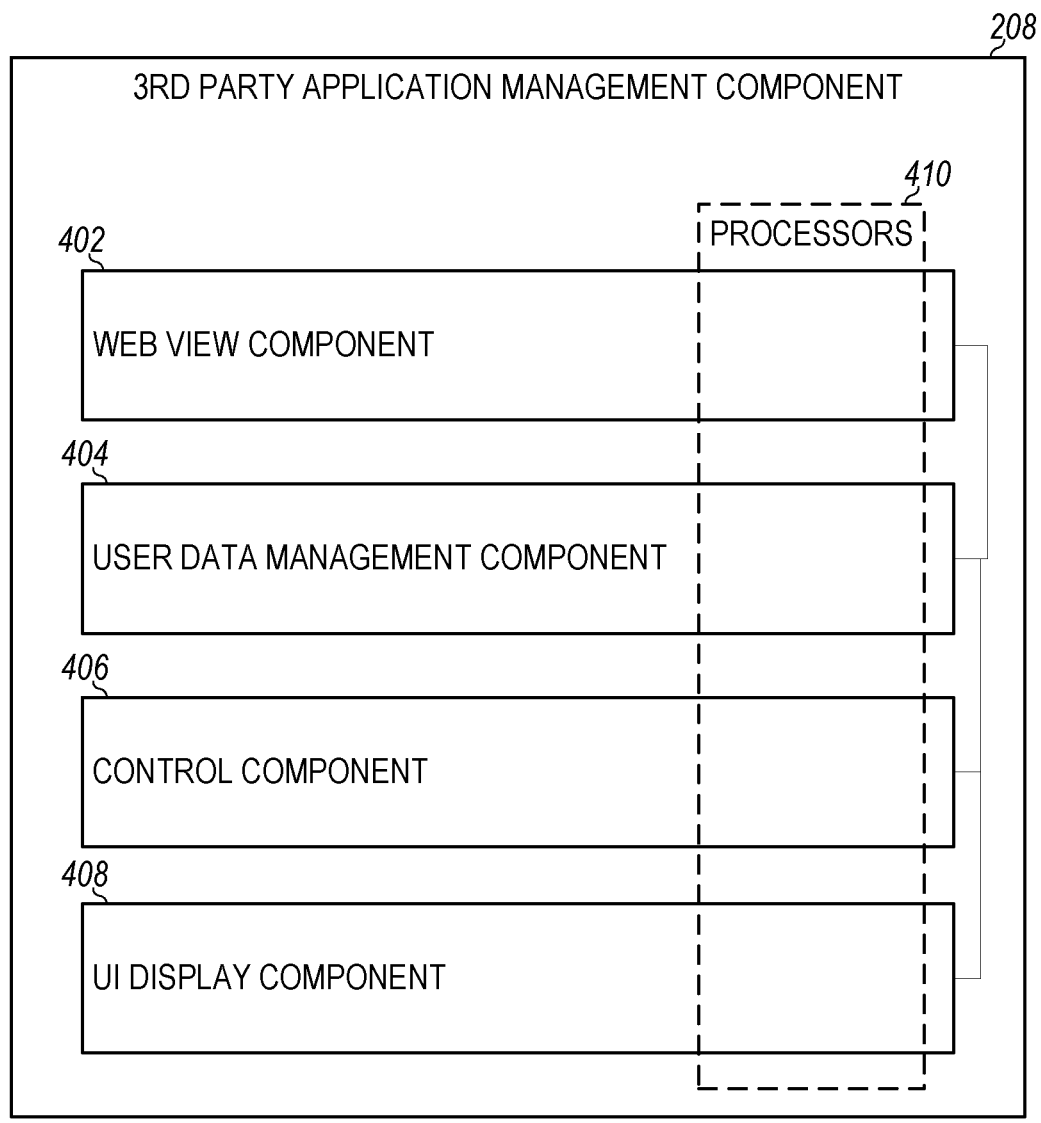
FIG. 4 is a block diagram illustrating functional components of a feed display system that forms part of the messaging system, according to some example embodiments.

FIG. 4 is a block diagram illustrating functional components of the $3^{rd}$ party application management component 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the $3^{rd}$ party application management component 208 to facilitate additional functionality that is not specifically described herein. As shown, the $3^{rd}$ party application management component 208 includes a web view component 402, a user data management component 404, a control component 406, and a UI display component 408.

The above referenced functional components of the 3rd party application management component 208 are configured to communicate with each other (e.g., via a bus, shared memory, a switch, or APIs). Collectively, these components facilitate presenting of a feed of information content to a social network user based on content added or updated by friends of the social network user. In other words, the web view component 402, user data management component 404, control component 406, and user interface display component 408 work in conjunction to provide user interface access to $3^{rd}$ party applications via the messaging client component 104. By providing access via the messaging client component 104, $3^{rd}$ party application are able to display user interfaces that rely on user data, without exposing the user data to the $3^{rd}$ party applications themselves. This improves user privacy and security of the messaging client application 104.

The web view component 402 provides for execution of a web-based application within the messaging client application 104. In some aspects, the web view component 402 includes an embedded browser.

The user data management component 404 provides access to user data. User data may include, for example, personally identifiable information (PII) about one or more users of the social network. This may include demographic information such as user age, gender, address, and/or indications of the user's online behavior.

The control component 406 may provide for control of a user interface of the messaging client application 104 via an application running within the web view component 402. For example, a third party application running within the web view component 402 may send a request to the control component 406 to display a user interface within the messaging client application 104. The control component 406 may arbitrate this request and if appropriate, generate a user interface via the UI display component 408, discussed below. The control component 406 may define a user interface to be displayed by the UI display component 408, discussed below, based on user data accessed via the user data management component 406. For example, which UI to display may vary based on one or more characteristics of a particular user, such as variations in the demographics of a user, or based on variations in content preferences of the user.

The UI display component 408 may display a user interface based on input provided by the control component 406. For example, the UI display component may display a user interface specified by the control component 406.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the $3^{rd}$ party application management component 208 may physically include an arrangement of one or more processors 410 (e.g., a subset of or among one or more processors of a machine) configured to perform the operations described herein for that component. As another example, any component of the $3^{rd}$ party application management component 208 may include software, hardware, or both, that configure an arrangement of the one or more processors 410 to perform the operations described herein for that component. Accordingly, different components of the $3^{rd}$ party application management component 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to FIGS. 5-9.

Figure 5:
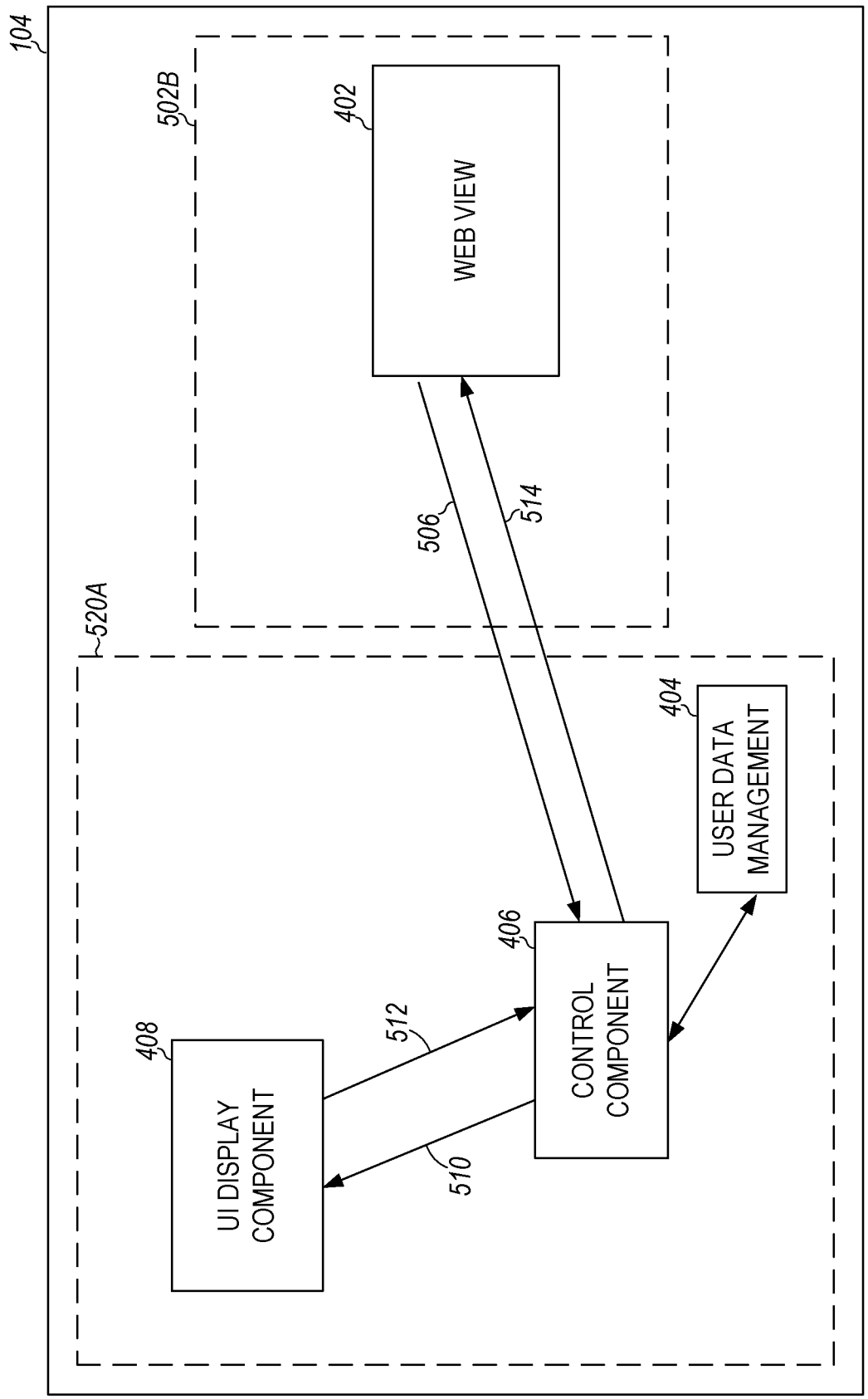
FIG. 5 shows an overview diagram of message flow between various components of the messaging client application 104.

FIG. 5 shows an overview diagram of message flow between various components of the messaging client application 104. FIG. 5 shows that an application running within the web view component 402. The web view component 402 is running within a separate security domain 520b compared to the rest of the application 104, which runs within a security domain 520a. The security domain 520b restricts access to data, such as user data, by the web view component 402.

The web view component 402 sends a message or other signal 506 to the control component 406. The signal 506 may indicate the web view requests to display a particular type of user interface. In some aspects, the particular type of user interface may be a particular type of advertisement. Upon receiving the signal 506, the control component may determine which particular user interface may satisfy the request indicated by the signal 506. The control component 406 may consult user data managed by the user data management component 404 to determine the particular type of user interface to display. Note the user data relied upon by the control component 406 may not be accessible to the web view component 402 due to the security domain 520 of the web view 402.

Once a user interface is selected by the control component 406, the control component 406 sends a message or other signal 510 to the UI display component 408, indicating the selected user interface should be displayed. The UI component 408 then displays the indicated user interface. The UI component 408 may also track status of the displayed user interface. For example, if the user interface displays a video, the UI display component 408 may track a percentage of the video watched by the user. Similarly, the UI display component 408 may track to what extent the displayed user interface retains an active focus during a time the UI is displayed.

After the display of the UI selected by the control component 406 is complete, a signal 512 is sent from the UI display component 408 to the control component 406 indicating the completion. The signal 512 may also include indications of the results of the display. For example, as discussed above, one or more metrics reflecting a user experience with the displayed user interface may be provided back to the control component 406 by the UI display component 408. The control component 406 then informs the application running within the web view component 402 that the display of the user interface has been completed. The control component 406 may further indicate a result or status of the UI display. For example, in some aspects, an application running within the web view component may be a game application. The game application may condition certain game features based on a type of advertisement watched by a user playing the game, and how robust the experience of the advertisement was. For example, if the user interacted with the advertisement through the entire display process, the game may provide a first reward to the user, such as a number of points or additional game turns or life points. If the user's interaction was less robust, for example, the user canceled the advertisement before the entire message was delivered, or if the advertisement was placed in the background for a portion of the time that the advertisement was played, this may result in different amounts of benefits being granted to the user by the game application.

Figure 6:
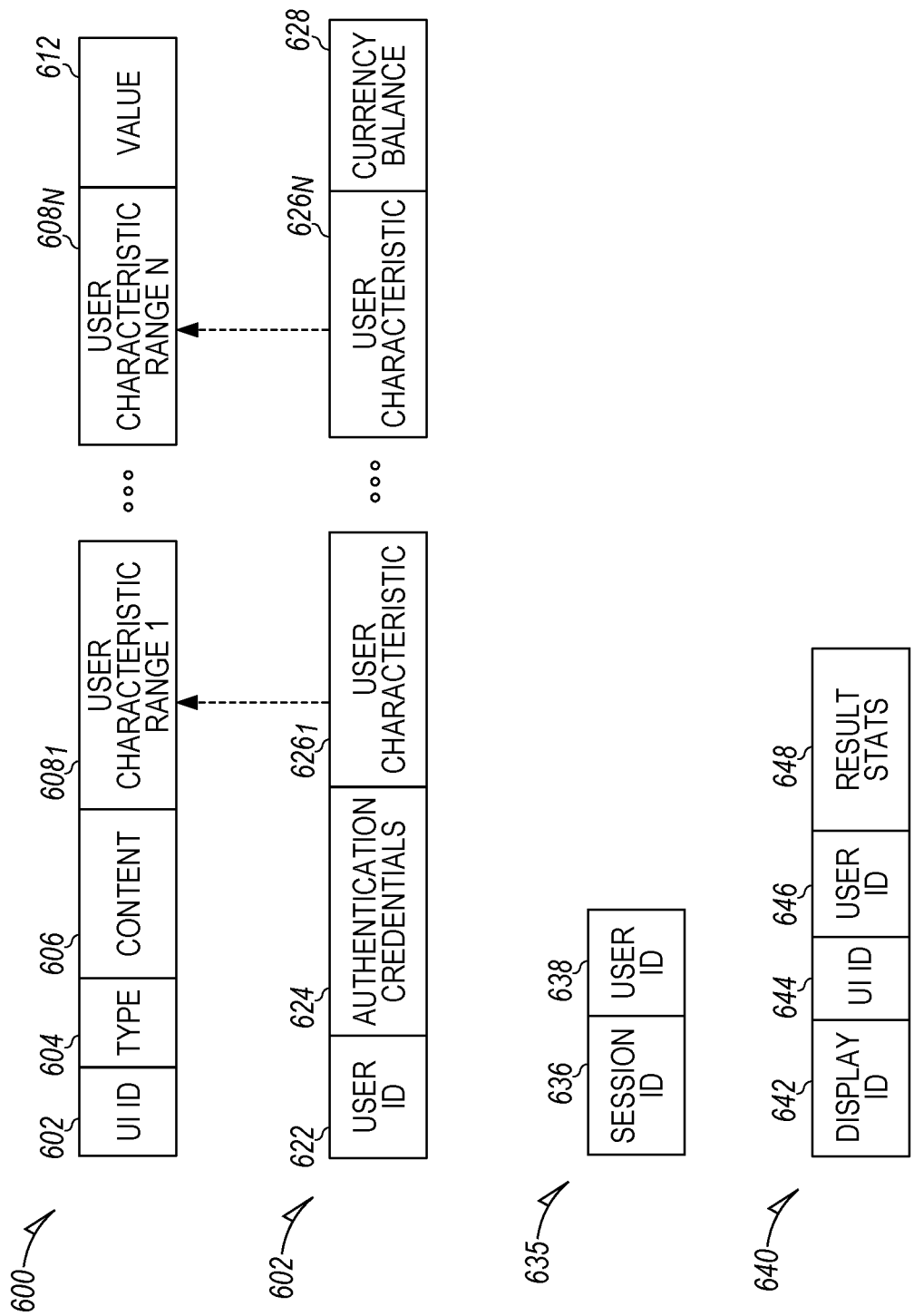
FIG. 6 shows example data structures that may be maintained by one or more of the disclosed embodiments.

FIG. 6 shows example data structures that may be maintained by one or more of the disclosed embodiments. In some aspects, one or more of the data structures discussed below with respect to FIG. 6 may be included in the database(s) 120. While the data structures of FIG. 6 are discussed below as if they represent rows in a relational database table, one of skill would understand that the data structures of FIG. 6 may be implemented using alternative technologies, such as implementation in an unstructured data store, as in memory linked lists, queues, records/structures, or other data storage and/or organization technologies and/or strategies.

FIG. 6 shows a user interface table 600, user table 620, session table 635, and results table 640. The user interface table 600 includes a user interface identifier 602, type field 604, content field 606, one or more user characteristics $608_1 \ldots n$, and a user interface value field 612. The user interface identifier 602 uniquely identifies a user interface. The type field 604 indicates a type of user interface identified by the user interface identifier 602. The content field 606 includes data defining content of the user interface. For example, if the user interface is a video, the content field 606 stores data defining the video. The user characteristic ranges $608_1 \ldots n$ define ranges for user characteristics that may qualify a user for viewing of the content identified by the content identifier 606. For example, a sum of characteristics of a particular user that fall within a respective one of the particular ranges $608_1 \ldots n$ may be used to select which content is displayed to a user. As one example, the ranges may define that the content 606 is appropriate for users aged 40-45 and female. The user interface value field 612 indicates a value that is awarded upon completion of display of the UI identified by UI ID 602. The value field 612 may indicate a maximum value that can be awarded. As discussed below, in some aspects, partial completion of display of a user interface (e.g. a video), may be awarded a prorated portion of the value stored in the value field 612.

The user table 620 includes a user identifier 622, authentication credentials 624, one or more user characteristics $626_1 \ldots n$, and a currency balance 628. The user identifier 622 uniquely identifies a user account. The authentication credentials 624 define credentials that must be entered to establish a session linked to the user account. The user characteristics $626_1 \ldots n$ define one or more characteristics of the user. This may include demographic information of the user, such as age, gender, address, phone number, or other demographic information. The user characteristics may also include information that characterizes the user's interests. For example, a plurality of characteristics may be maintained indicating the user's affinity to different subject areas, such as sports, news, weather, politics, world events, human interest, etc. The currency balance 628 indicates an amount of currency associated with the user account. The currency may be used to purchase virtual or real goods within the context of the social networking system 116. The user characteristics $626_1 \ldots n$ may have corresponding criterion or ranges $608_1 \ldots n$ in the user interface table 600.

The session table 635 stores a session identifier 636 and a user identifier 638. The session identifier 636 indicates a currently active session. The session may be established in response to a successful authentication of a user account.

The results table 640 includes a display identifier 642, user interface identifier 644, user identifier 646, and results statistics 648. The display identifier 642 defines a unique instance of a display of a particular user interface (identified by 644) to a particular user (identified by 646). The results statistics 648 characterize a level of engagement of the user with the displayed user interface. For example, the results statistics 648 may indicate one or more of whether the user watched the entire content, whether the content was actively selected during the time watched, whether the user selected a control to skip at least a portion of the content, whether the user replayed the content, whether the user shared, favorited, or forwarded the content.

Figure 7A:
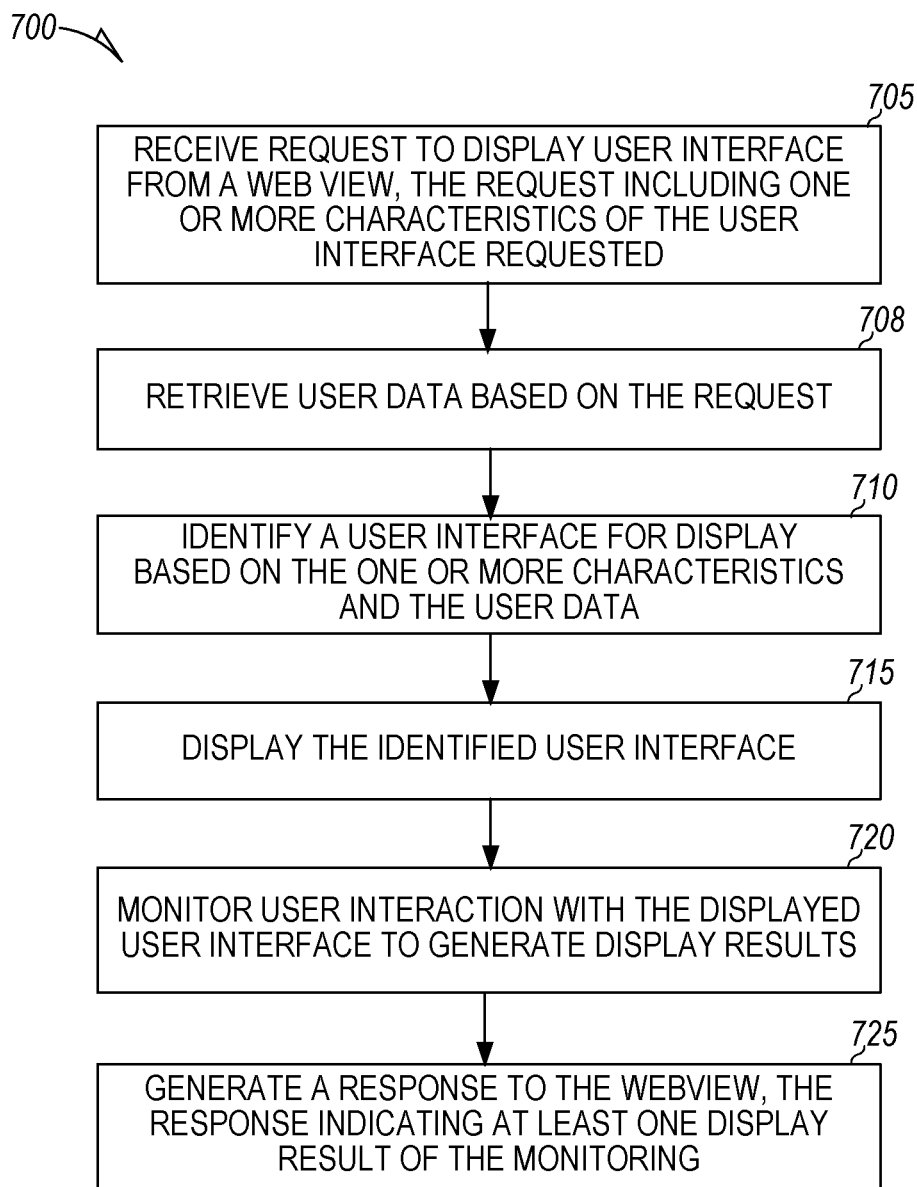
FIG. 7A is a flowchart of a method for displaying a user interface in response to a request from an application running in a web view.

FIG. 7A is a flowchart of a method for displaying a user interface in response to a request from an application running in a web view. One or more of the functions discussed below with respect to FIG. 7A may be performed by hardware processing circuitry. For example, instructions stored in a memory may configure hardware processing circuitry to perform one or more of the functions discussed below with respect to FIG. 7A. In some aspects, one or more of the functions discussed below may be performed by the messaging client application 104.

In operation 705, a request is received from a web view application. (e.g. request 506). The request is to display a user interface meeting one or more criteria. The criterion may be indicated in the request. For example, the request may indicate a type of user interface to display (e.g. 604). The request may also indicate one or more criteria for one or more characteristics of the user interface. For example, the request may indicate that the user interface is to display a video, text data, image data, a poll, a survey, or other type of multimedia content. In some aspects, operation 705 may be performed by the control component 406, which is operating within a first security domain (e.g., 520*a*). The control component 406 may be included in a native application, which runs on top of an operating system of a device. As discussed above, the first security domain 520*a* provides access to user data via the user data management module 404. The web view application from which the request is received is operating in a second security domain (e.g. 520*b*). The second security domain does not allow access to user data by the web view application.

In operation 708, user data is retrieved based on the request. Operation 708 may include reading any of the data described above with respect to the user table 600 of FIG. 6. The data may be read to prepare for operation 710, discussed below. Option 708 may occur from within the first security domain (e.g. 520*a*) which has access to the user data, such as the table 620.

In operation 710, a user interface is identified for display. The identification is based on the one or more characteristic provided in the request and the user data. As discussed above, in some aspects, a user interface table (e.g. 600) may define a plurality of user interfaces, and corresponding criterion or ranges of characteristics for users viewing those user interfaces. As one example, one user interface may be configured for viewing by children (a criterion may include age<15 for example), while a second user interface may be configured for viewing by adults (e.g. age>18 for example). The user data retrieved in operation 708 may be matched against the criterion defined for user interfaces in the user interface table, and a count of matching criterion or characteristics determined. A user interface with a highest number of matching criterion or characteristics may be selected for display. One example embodiment of operation 710 is described below with respect to FIG. 8.

In operation 715, the user interface is displayed. For example, content (e.g. 606) defining the user interface may be written to a display device.

In operation 720, user interaction with the displayed user interface is monitored to generate display results. In various aspects, operation 720 may monitor input provided by the user to characterize a level of user engagement with the displayed user interface. Parameters that may be monitored can include whether the displayed user interface retains a focus while it is being displayed, whether the user canceled the displayed user interface or selected to skip one or more portions of the user interface, whether the user minimized the user interface, and a length of any idle period that may occur after the user interface has completed display. For example, an idle period longer than a threshold may indicate the user was not viewing the user interface, and thus, when any display activity of the user interface completed, the user did not react to the completion. In some aspects, operation 720 may determine a percentage of the user interface that was successfully displayed and/or received by a user. For example, if the user interface includes a video, the monitoring of operation 720 may determine a total percentage of the video that is played, for example, while a window playing the video retained focus. In some aspects, a virtual currency credit may be assigned to the web view application and/or a user running the web view application based on a value of the displayed UI (e.g. 612). The value may be pro-rated based on one or more attributes of the UI display. For example, if 50% of the UI (e.g. a video) is successfully displayed, 50% of the value of the UI (e.g. 612) may be allocated to the web view application and/or user running the web view application.

In operation 725, a response to the web view application is provided. The response may indicate one or more results of the monitoring in operation 720. In some aspects, the response may include an amount of virtual currency credited to the user as a result of the display of the user interface and the monitored user interaction.

Figure 7B:
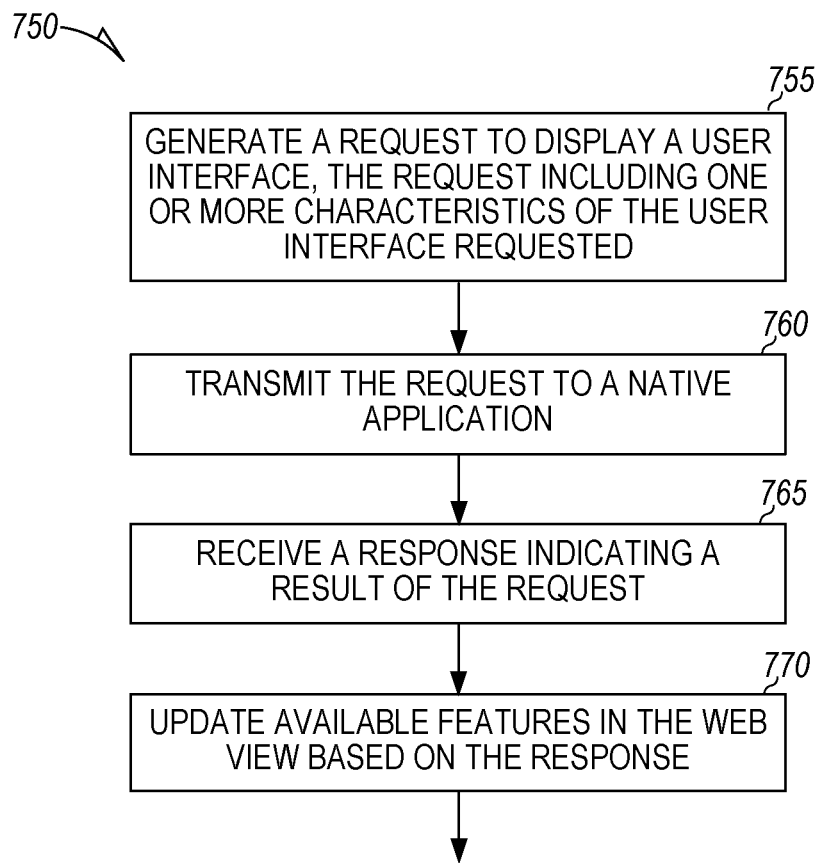
FIG. 7B is a flowchart of a method for displaying a user interface by a web view that does not have access to user data.

FIG. 7B is a flowchart of a method for displaying a user interface by a web view. One or more of the functions discussed below with respect to FIG. 7B may be performed by hardware processing circuitry. For example, instructions stored in a memory may configure hardware processing circuitry to perform one or more of the functions discussed below with respect to FIG. 7B. In some aspects, one or more of the functions discussed below may be performed by the messaging client application 104. In some aspects, the process 750 of FIG. 7B may be performed by a web view application running under a first security domain. The web view application may interact, as discussed above, with a native application, running under a second security domain. The native application has access to user data via the second security domain. The first security domain prevents access to the user data. For example, the web view application is unable to access the user data because the first security domain prevents such access.

In operation 755, a request is generated to display a user interface. The request is generated to include one or more characteristics of the user interface requested. For example, the request may indicate a type of user interface to be displayed (e.g. as indicated by type 604). In some aspects, the request may indicate an amount of virtual currency desired or requested. For example, a web view application may seek to obtain a first amount of virtual currency via display of a user interface. The first amount may be based, for example, on a product or feature a user of the web view application desires to purchase, or has requested to purchase via the web view application.

In operation 760, the request is transmitted to a native application. For example, as discussed above with respect to FIG. 5, the web view 402 may transmit a message 506 to the control component 406 within the security domain 520a.

In operation 765, a response to the request is received by the web view application. The response indicates a result of the request. In some aspects, the response indicates, for example, a completion status of displaying a user interface. For example, if a user interface was displayed that includes a video, the response may indicate a percentage of the video that was played and/or viewed.

In operation 770, features of the web view are selectively enabled or disabled based on the result indicated in the response. For example, one or more features of a game may be enabled based on the response. The features may include, for example, life points in the game, additional weapons available for use by a player in the game, additional characters or costumes for use in the game, new scenes or environments for navigation by players in the game.

Figure 8:
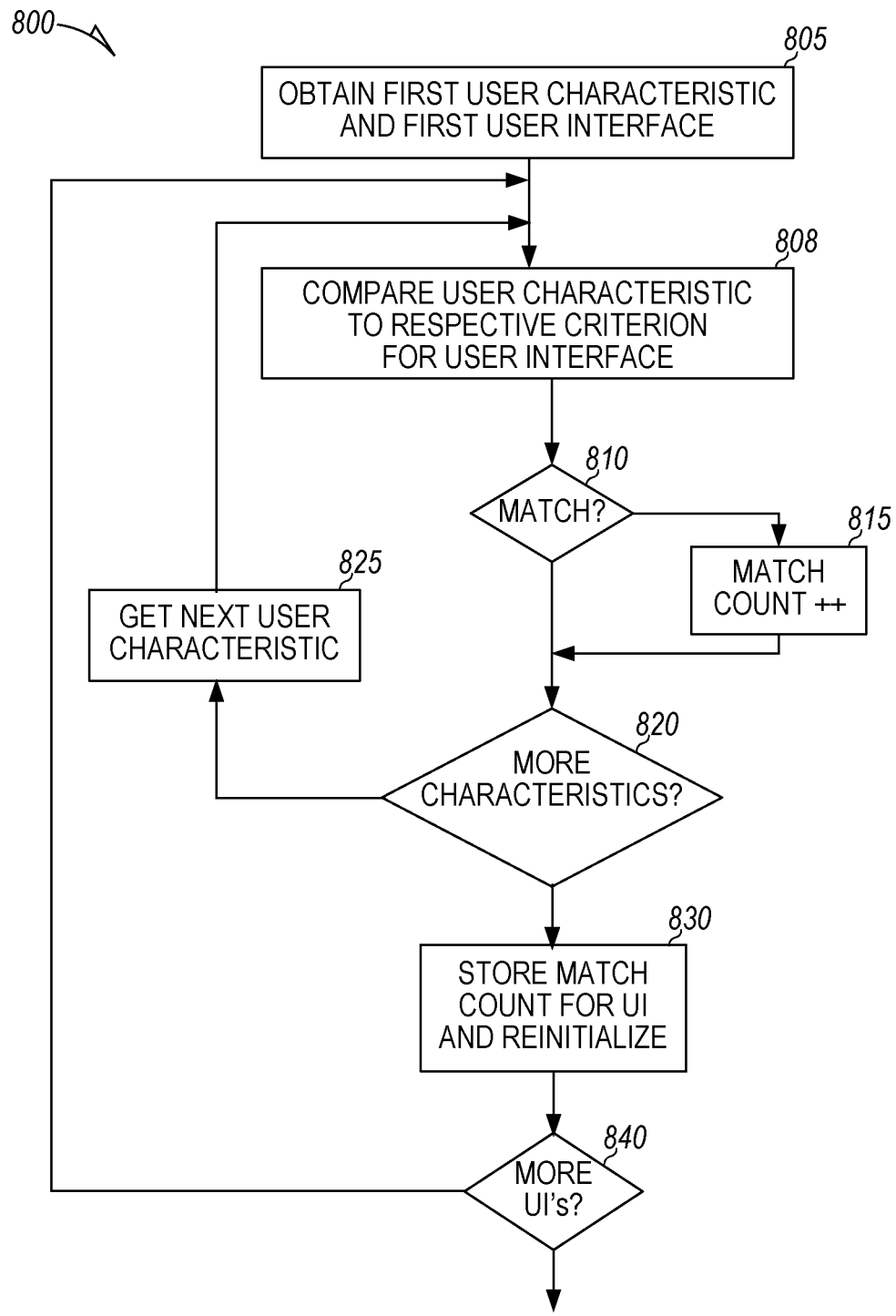
FIG. 8 is a flowchart of a method for identifying a user interface to display.

FIG. 8 is a flowchart of a method for identifying a user interface to display. One or more of the functions discussed below with respect to FIG. 8 may be performed by hardware processing circuitry. For example, instructions stored in a memory may configure hardware processing circuitry to perform one or more of the functions discussed below with respect to FIG. 8. In some aspects, one or more of the functions discussed below may be performed by the messaging client application 104.

In operation 805, a first user characteristic and a first user interface are obtained. For example, each user account may be associated with a plurality of user characteristics. The user characteristics may include demographic information of the user, such as age, gender, address, or other demographic information. The user characteristics may also include metrics or statistics that characterize certain interests or behaviors of the user. Obtaining a first user interface may include identifying records in a database for a user interface. For example, obtaining a first user interface may include identifying a particular row in the user interface table 600 in some aspects.

In operation 808, the user characteristic is compared to a respective criterion for the user interface. For example, as discussed above with respect to FIG. 6, one or more user characteristics (e.g., $626_{1 \ldots n}$) may correspond to one or more criteria or characteristic ranges (e.g., $608_{1 \ldots n}$) for a user interface (e.g. a row in table 600).

Decision operation 810 determines if the user characteristic matches the respective criterion specified for the user interface. If a match is found, process 800 moves to block 815, which increments a match count for the user interface. Decision block 820 determines if additional user characteristics should be evaluated. If so, block 825 obtains a next characteristic, which is then compared in operation 808 to a respective criterion or range of the user interface. If there are no more characteristics to compare for the current user interface, block 830 stores the match count for the current user interface (e.g. row of UI table 600), After process 800 iterates through the user interfaces, a match count for each user interface is available (via block 815). These match counts may then be evaluated to determine a best match. The best match may be based on which of the user interfaces had the highest match count. In some aspects, each characteristic may be associated with a weight, and thus a weighted match count is determined for each user interface. A user interface having the highest weighted match count may then be selected or identified for display. Some aspects of process 800 may also consider whether the user interface has been previously displayed to this user and/or within a time period. If the user interface was previously displayed, it may not be displayed again until a defined period of time elapses. Instead, another UI having a lower match count may be selected for display.

Figure 9:
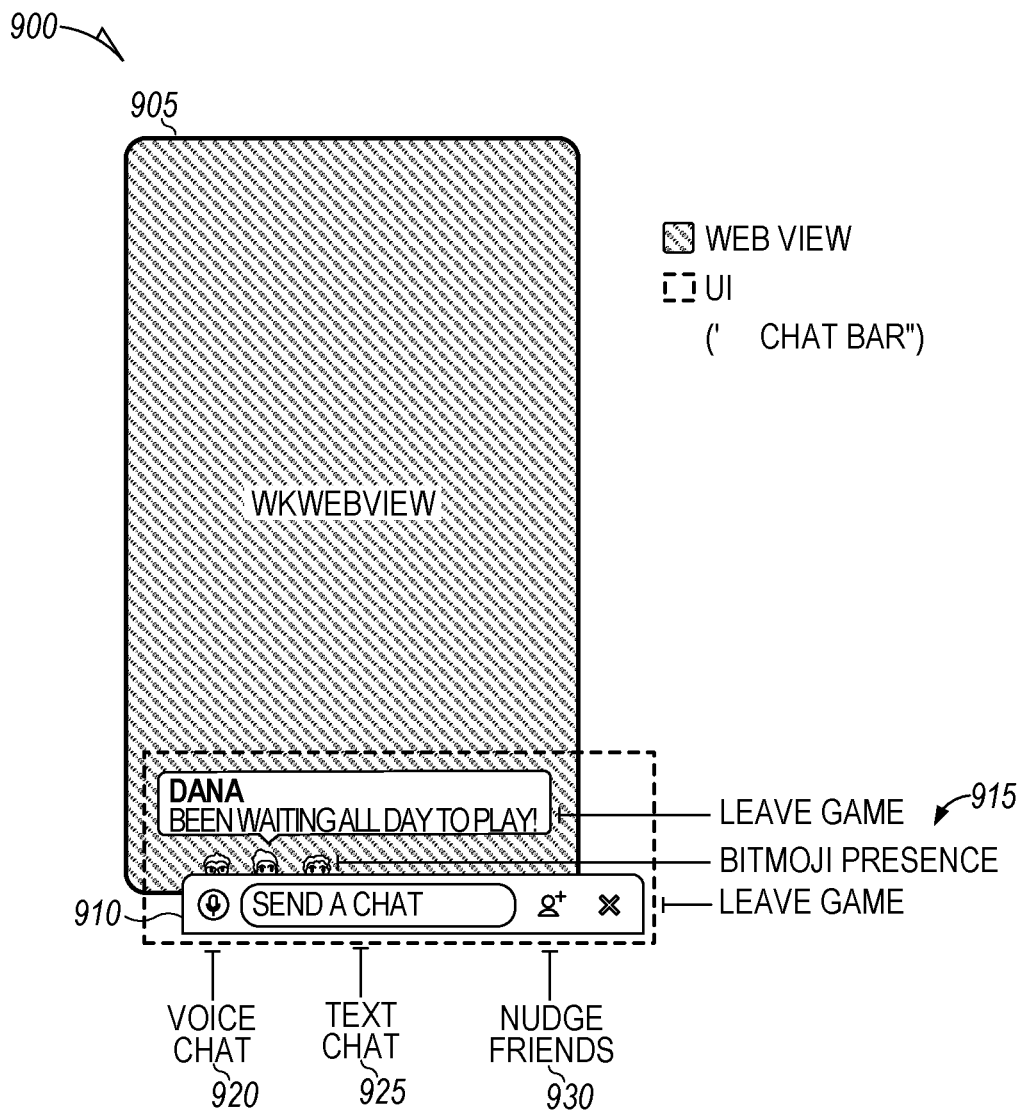
FIG. 9 shows an example user interface structure that may be implemented in at least some of the disclosed embodiments.

FIG. 9 shows an example user interface structure that may be implemented in at least some of the disclosed embodiments. FIG. 9 shows a web view window 905 and a control 910. In some aspects, an application may be implemented using HTML5 and be displayed in the web view window 905. The application may be launched from the control 910. The control 910 may be implemented on a native operating system of the platform displaying the user interface 900, as a separate layer on top of a webview. The control 910 may provide functionality including bitmoji presence 915, which displays other social network members that are interacting with the application; voice chat 920, which provides for voice streaming by, in some embodiments, tapping the microphone, text chat 925, which provides for sending text messages to other members engaged with the application; a nudge function 930, which sends a push notification to a select set of users to remind them to engage with the application, and leave application functions, which quits the application and returns to an underlying chat conversation.

Figure 10:
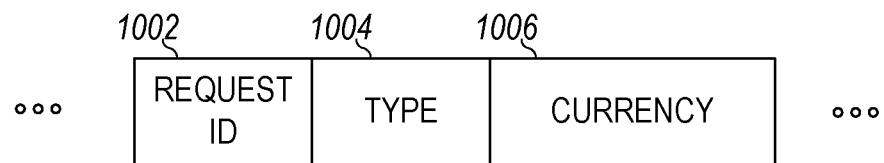
FIG. 10 shows examples of two messages that may be implemented in at least some of the disclosed embodiments.
Figure 10:
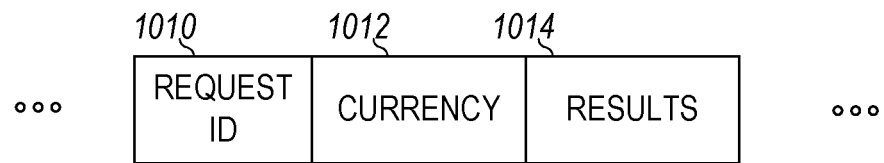

FIG. 10 shows examples of two messages that may be implemented in at least some of the disclosed embodiments. A first message 506 is a request message generated by a web view application. The request message indicates a request to display a user interface, as discussed above, for example, with respect to FIG. 5. The request message 506 includes a request id 1002, type field 1004, and a currency field 1006. The request id 1002 is set by the web view application and identifies the request for the web view application. The type field 1004 indicates a type of user interface requested for display. The currency field 1006 indicates an amount of virtual currency that is requested as part of the display of the user interface.

The response message 512 includes a request id field 1010, currency field 1012, and results indication field 1014. The request id field 1010 is set, by the control component 406 to a value equivalent to the request id field 1002 for the request message 506 that corresponds to the response 514. The currency field 1012 indicates a resulting currency credited to a balance of the user account (e.g. 628) as a result of a display of a user interface as requested by the corresponding request 506 (the request including the same value in the request id field 1002 as the request id field 1010.

While the description of FIG. 10 above describes messages 506 and 514, in some embodiments, the web view application (e.g. running in the web view component 402) may communicate with the control component 406 using method or functions calls instead of messages in some embodiments. In these embodiments, fields of the messages 506 and 514 shown in FIG. 10 may instead be communicated between the web view application and the control component 406 via input parameters having equivalent values. Other methods of communication between components are also contemplated and are known in the art. The example messages of FIG. 10 are intended to only be one illustrative example.

Figure 11:
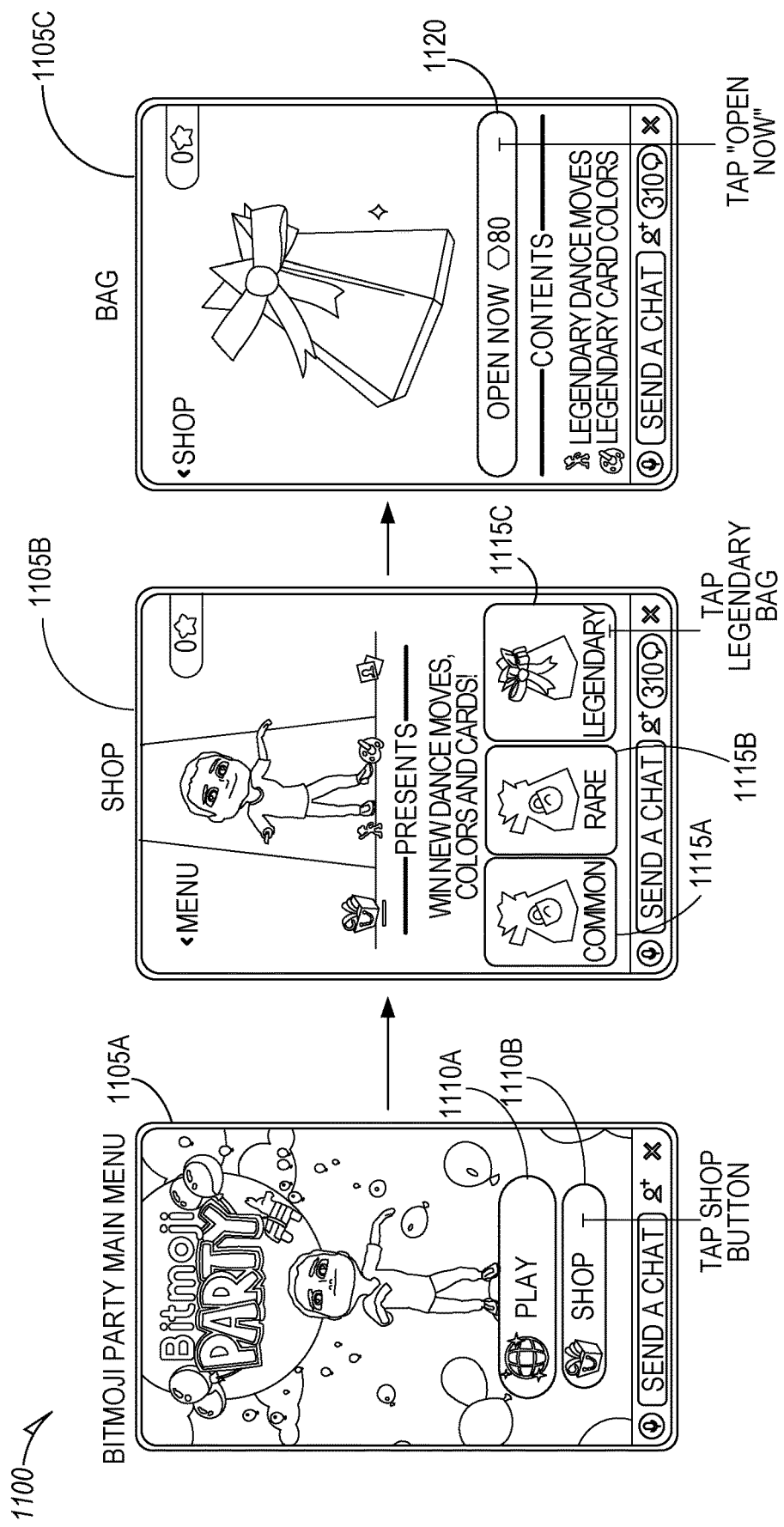
FIG. 11 shows examples of user interfaces that may be implemented in one or more of the disclosed embodiments.

FIG. 11 shows example user interfaces, one or more of which may be implemented in one or more of the disclosed embodiments. FIG. 11 shows user interfaces 1105a-c. The user interface 1105a includes a play control 1110a and a shop control 1110b. Selection of the shop control 1110b presents the user interface 1105b. The user interface 1105b provides three shopping options 1115a-c. Upon selection of the option 1115c, the user interface 1105c is presented. The user interface 1105c includes an "open now" control 1120.

Figure 12:
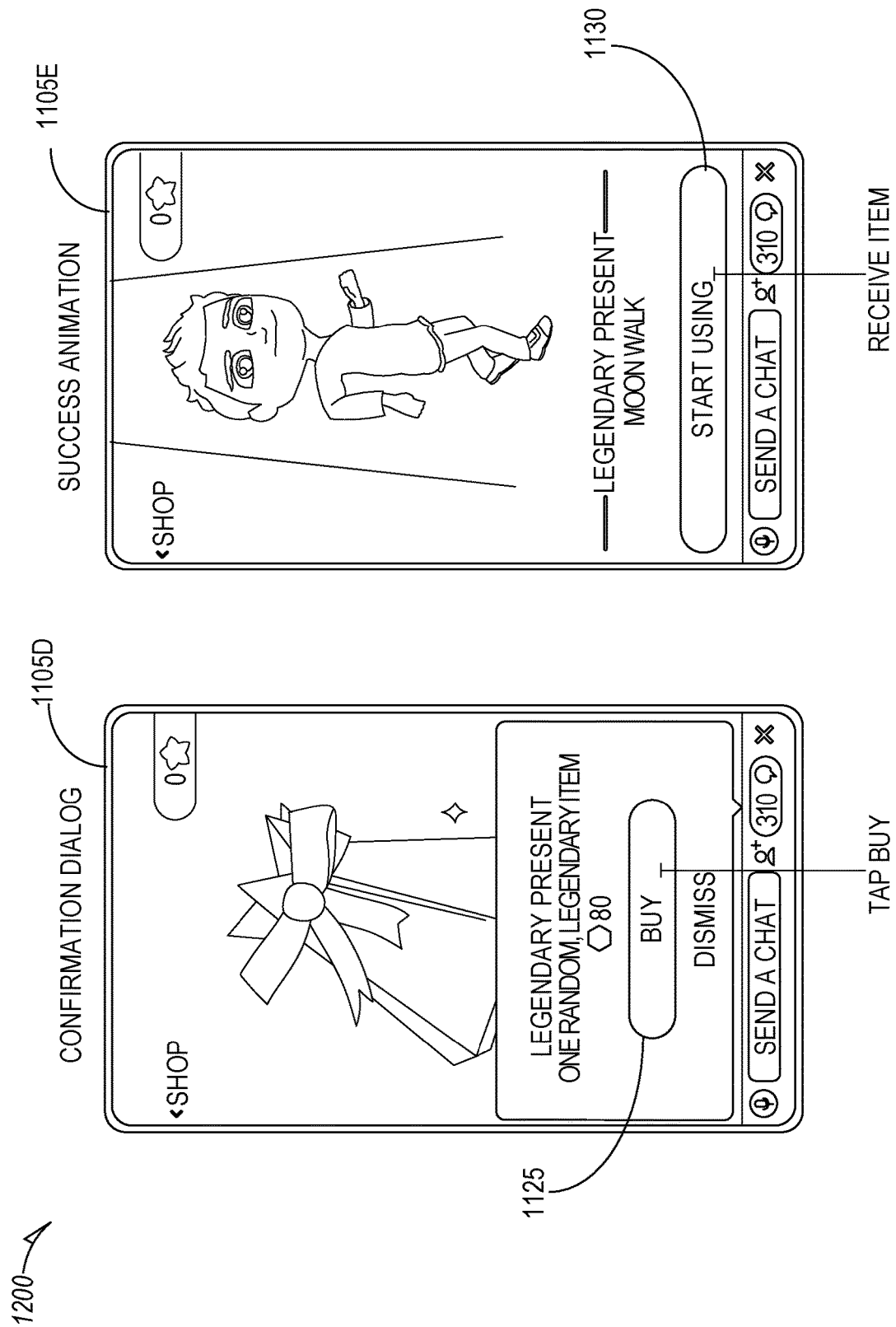
FIG. 12 shows examples of user interfaces that may be implemented in one or more of the disclosed embodiments.

FIG. 12 shows example user interfaces, one or more of which may be implemented in one or more of the disclosed embodiments. FIG. 12 shows user interfaces 1105d-e. User interface 1105d may be displayed in response to selection of the open now control 1120, discussed above with respect to FIG. 11. The user interface 1105d is configured to confirm purchase of an item, and includes a buy button 1125. Upon selection of the buy button 1125, the user interface 1105e is displayed, which confirms a successful transaction. If the purchase was for an electronic item, such as an item that appears in an online gaming application, a user may begin using the item by selecting the button 1130 shown in user interface 1105e.

Figure 13:
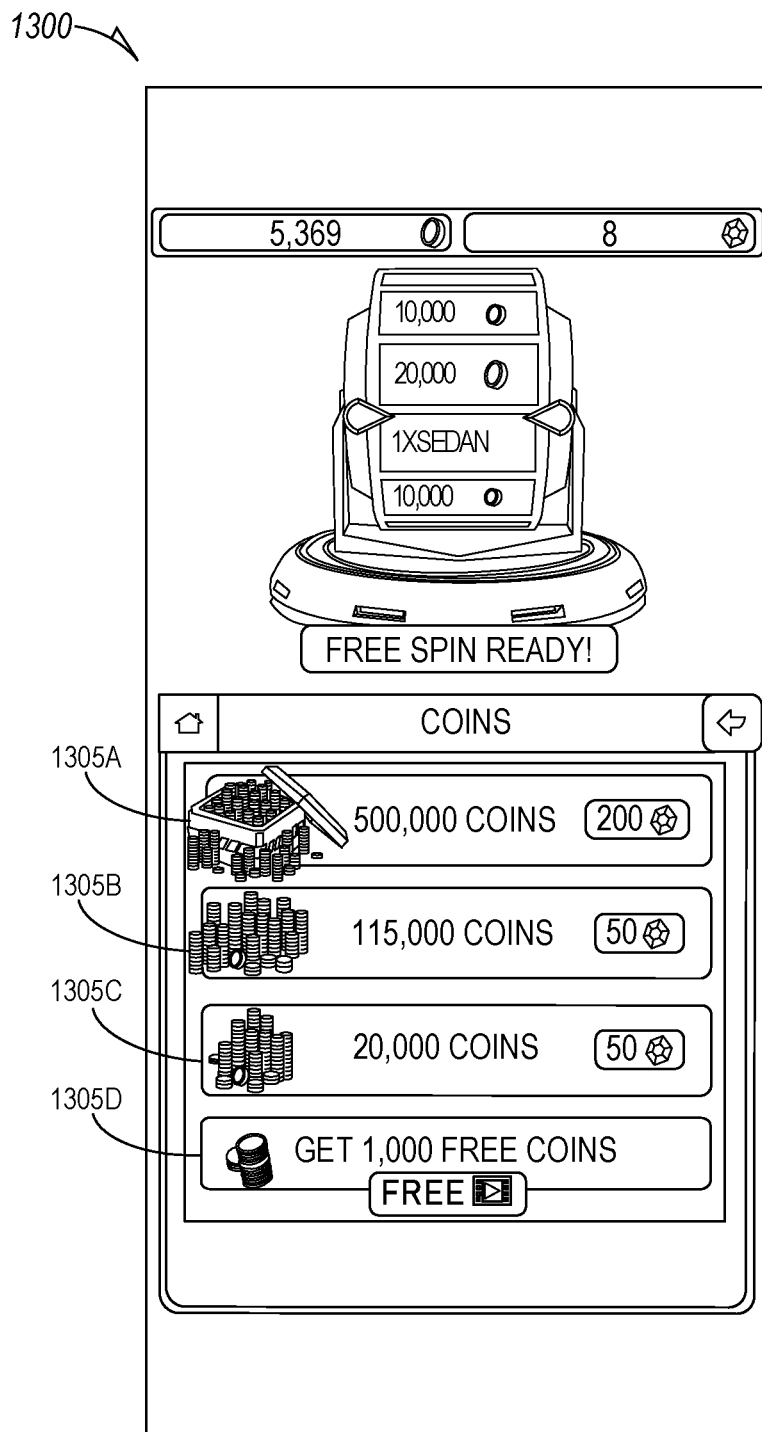
FIG. 13 shows an example user interface that may be implemented in one or more of the disclosed embodiments.

FIG. 13 shows an example user interface that may be implemented in one or more of the disclosed embodiments. FIG. 13 is an example of a user interface that may be displayed by a native application when requested by a web view application. The user interface 1300 shows multiple options that may be selected by the user. These are labeled 1305a-d. Depending on which option is selected, the user may receive a variable amount of virtual or real currency after completion of a task associated with the selected option.

Figure 14:
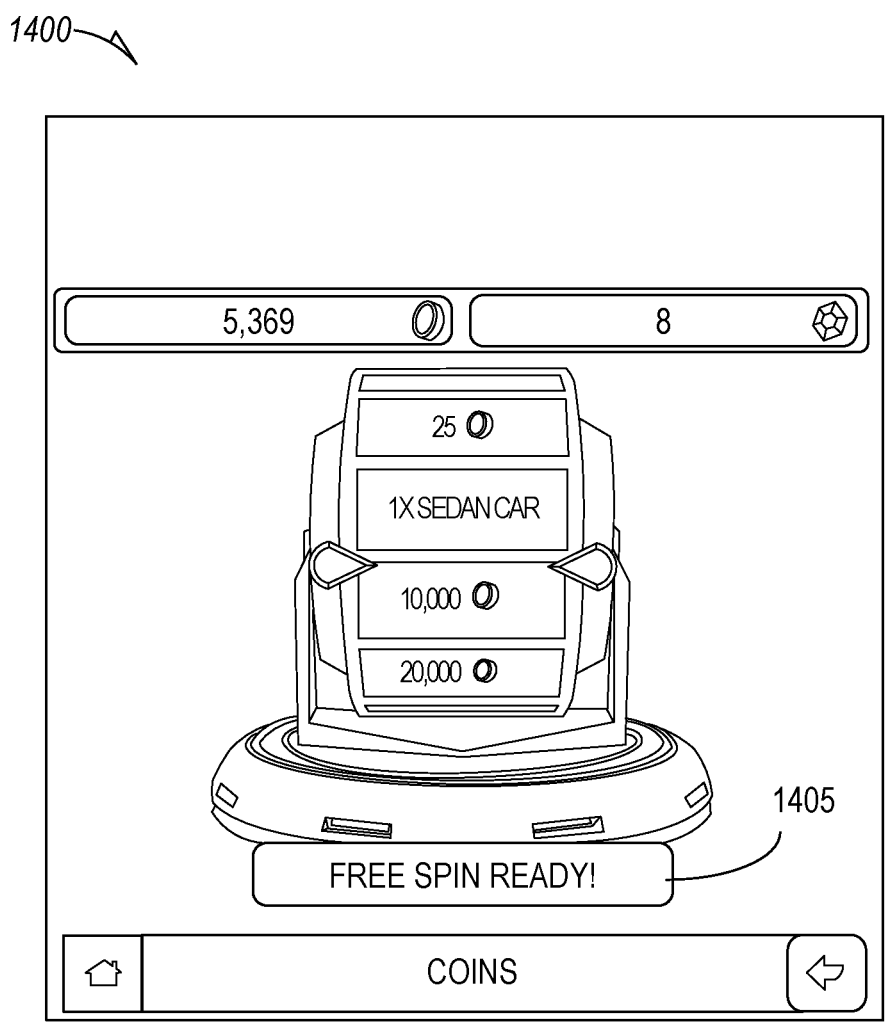
FIG. 14 shows an example user interface that may be implemented in one or more of the disclosed embodiments.

FIG. 14 shows an example user interface that may be implemented in one or more of the disclosed embodiments. After selecting one of the options 1305a-d discussed above with respect to FIG. 13, the user interface 1400 may be displayed. The user may be able to initiate a task via the user interface 1400 via selection of a control. In the example of FIG. 14, the user is able to initiate a "free spin" by selecting a button control 1405. The initiation of the task may determine an amount of virtual or real currency awarded to a user after completion of the task.

Figure 15:
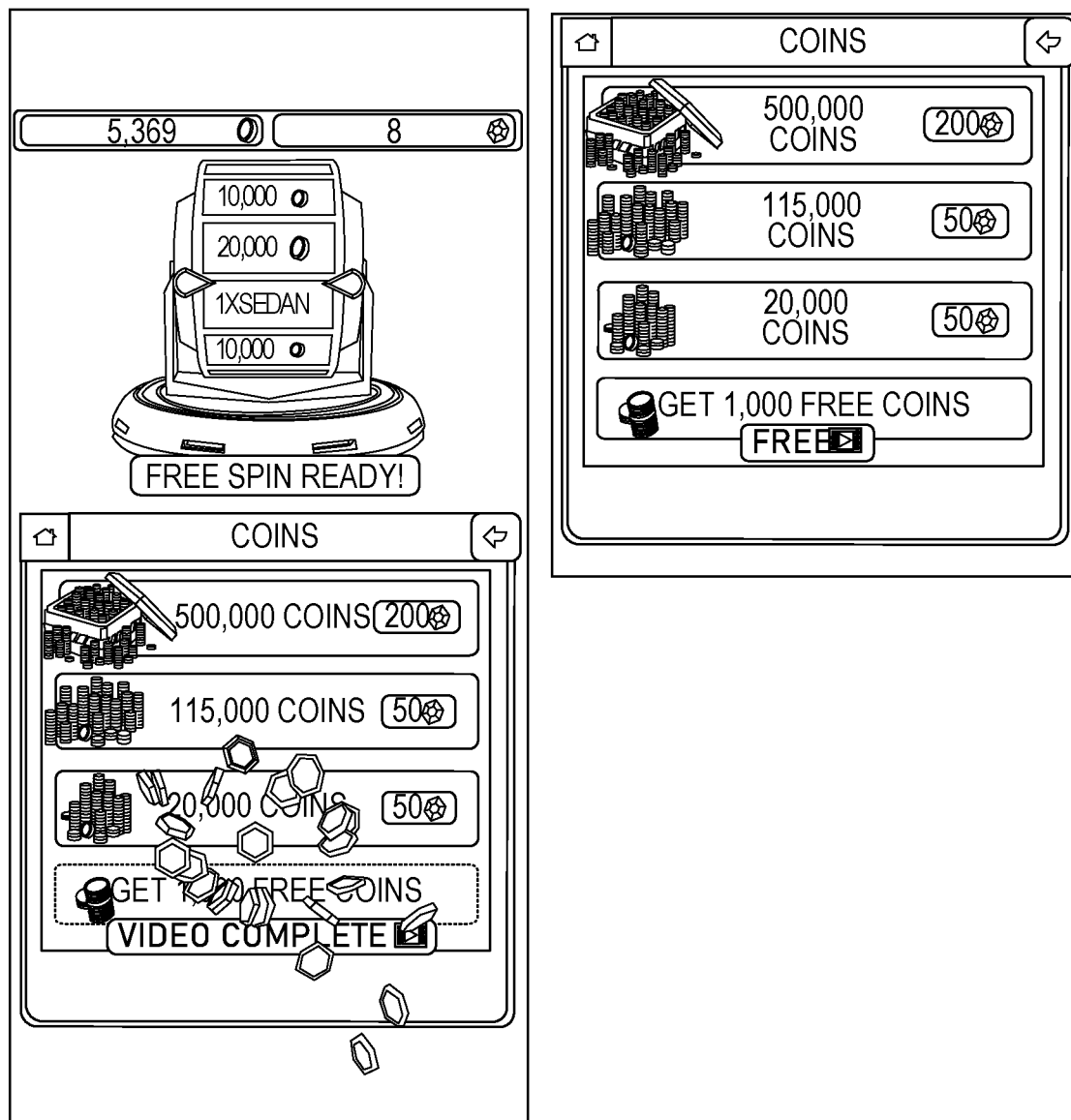
FIG. 15 shows an example user interface that may be implemented in one or more of the disclosed embodiments.

FIG. 15 shows an example user interface that may be implemented in one or more of the disclosed embodiments. The user interface 1500 shows that after completion of a task, such as watching a video, a user may be awarded an amount of virtual or real currency associated with the task. For example, if a video associated with 1000 units of virtual currency is completely watched by the user, they may be awarded the full 1000 units. If they complete 50% of the video, they may receive a pro-rated share of the 1000 units, for example, 500 units.

Software Architecture

Figure 16:
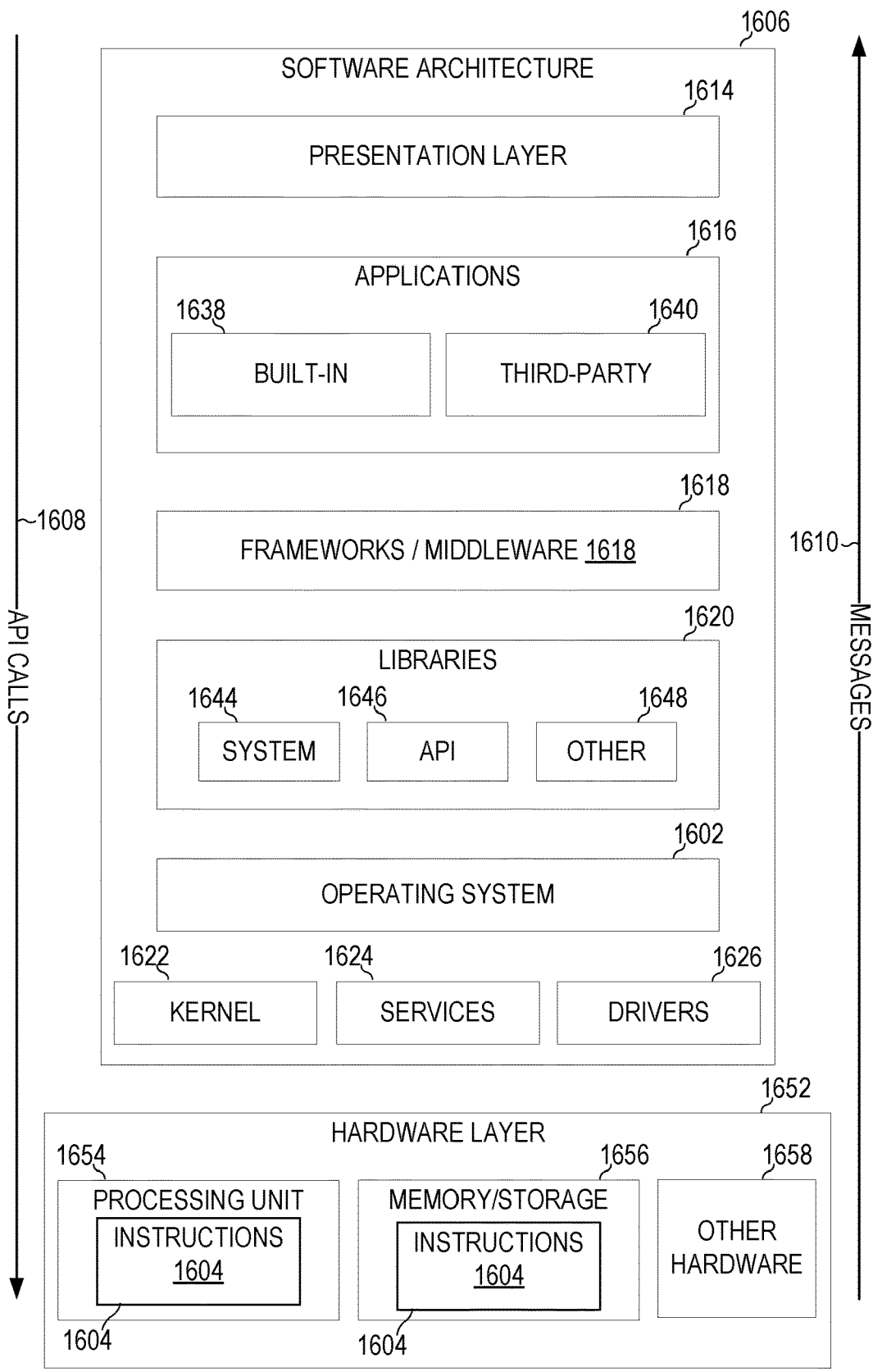
FIG. 16 is a block diagram illustrating a representative software architecture, which may be used in conjunction with various hardware architectures herein described.

FIG. 16 is a block diagram illustrating an example software architecture 1606, which may be used in conjunction with various hardware architectures herein described. FIG. 16 is a non-limiting example of a software architecture and it will be appreciated that many other architectures may be implemented to facilitate the functionality described herein. The software architecture 1606 may execute on hardware such as a machine 1700 of FIG. 17 that includes, among other things, processors 1704, memory/storage 1706, and I/O components 1718. A representative hardware layer 1752 is illustrated and can represent, for example, the machine 1700 of FIG. 17. The representative hardware layer 1652 includes a processing unit 1654 having associated executable instructions 1604. The executable instructions 1604 represent the executable instructions of the software architecture 1606, including implementation of the methods, components, and so forth described herein. The hardware layer 1652 also includes memory and/or storage 1656, which also have the executable instructions 1604. The hardware layer 1652 may also comprise other hardware 1658.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 16, the software architecture 1606 may be conceptualized as a stack of layers where each layer provides particular functionality. For example, the software architecture 1606 may include layers such as an operating system 1602, libraries 1620, frameworks/middleware 1618, applications 1616, and a presentation layer 1614. Operationally, the applications 1616 and/or other components within the layers may invoke API calls 1608 through the software stack and receive a response as messages 1610. The layers illustrated are representative in nature and not all software architectures have all layers. For example, some mobile or special-purpose operating systems may not provide a frameworks/middleware 1618 layer, while others may provide such a layer. Other software architectures may include additional or different layers.

The operating system 1602 may manage hardware resources and provide common services. The operating system 1602 may include, for example, a kernel 1622, services 1624, and drivers 1626. The kernel 1622 may act as an abstraction layer between the hardware and the other software layers. For example, the kernel 1622 may be responsible for memory management, processor management (e.g., scheduling), component management, networking, security settings, and so on. The services 1624 may provide other common services for the other software layers. The drivers 1626 are responsible for controlling or interfacing with the underlying hardware. For instance, the drivers 1626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1620 provide a common infrastructure that is used by the applications 1616 and/or other components and/or layers. The libraries 1620 provide functionality that allows other software components to perform tasks in an easier fashion than by interfacing directly with the underlying operating system 1602 functionality (e.g., kernel 1622, services 1624, and/or drivers 1626). The libraries 1620 may include system libraries 1644 (e.g., C standard library) that may provide functions such as memory allocation functions, string manipulation functions, mathematical functions, and the like. In addition, the libraries 1620 may include API libraries 1646 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1620 may also include a wide variety of other libraries 1648 to provide many other APIs to the applications 1616 and other software components/modules.

The frameworks/middleware 1618 provide a higher-level common infrastructure that may be used by the applications 1616 and/or other software components/modules. For example, the frameworks/middleware 1618 may provide various graphic user interface (GUI) functions, high-level resource management, high-level location services, and so forth. The frameworks/middleware 1618 may provide a broad spectrum of other APIs that may be utilized by the applications 1616 and/or other software components/modules, some of which may be specific to a particular operating system 1602 or platform.

The applications 1616 include built-in applications 1638 and/or third-party applications 1640. Examples of representative built-in applications 1638 may include, but are not limited to, a contacts application, a browser application, a book reader application, a location application, a media application, a messaging application, and/or a game application. The third-party applications 1640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1640 may invoke the API calls 1608 provided by the mobile operating system (such as the operating system 1602) to facilitate functionality described herein.

The applications 1616 may use built-in operating system functions (e.g., kernel 1622, services 1624, and/or drivers 1626), libraries 1620, and frameworks/middleware 1618 to create user interfaces to interact with users of the system. Alternatively, or additionally, in some systems interactions with a user may occur through a presentation layer, such as the presentation layer 1614. In these systems, the application/component "logic" can be separated from the aspects of the application/component that interact with a user.

Exemplary Machine

Figure 17:
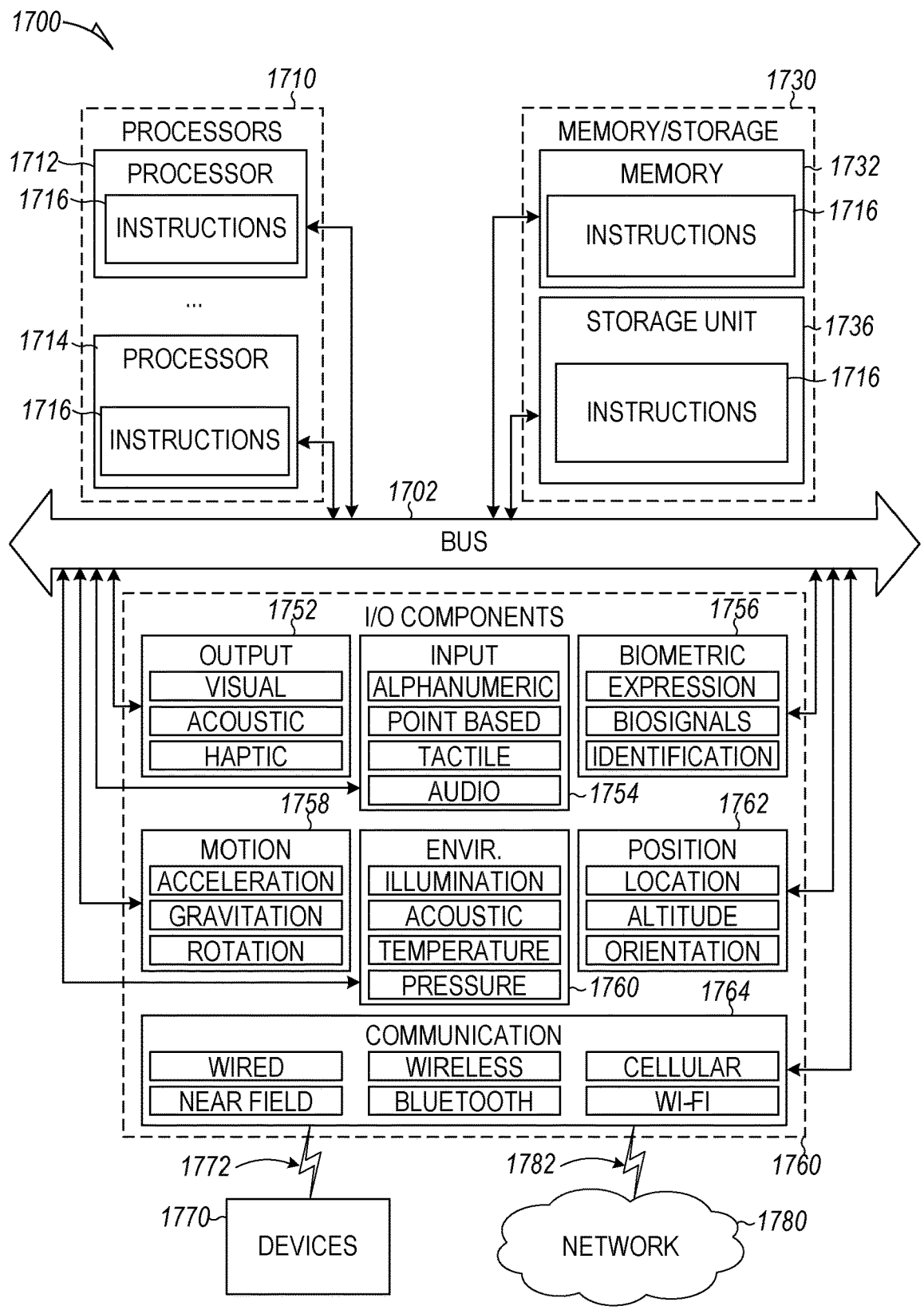
FIG. 17 is a block diagram illustrating components of a machine, according to some exemplary embodiments, able to read instructions from a machine-readable medium (e.g., a machine-readable storage medium) and perform any one or more of the methodologies discussed herein.

FIG. 17 is a block diagram illustrating components (also referred to herein as "modules") of a machine 1700, according to some exemplary embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1710 (e.g., software, a program, an application, an applet, an app, or other executable code) for causing the machine 1700 to perform any one or more of the methodologies discussed herein may be executed. As such, the instructions 1710 may be used to implement modules or components described herein. The instructions 1710 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1710, sequentially or otherwise, that specify actions to be taken by machine 1700. Further, while only a single machine 1700 is illustrated, the term "machine" shall also be taken to include a collection of machines that individually or jointly execute the instructions 1710 to perform any one or more of the methodologies discussed herein.

The machine 1700 may include processors 1704, memory/storage 1706, and I/O components 1718, which may be configured to communicate with each other such as via a bus 1702. The memory/storage 1706 may include a memory 1714, such as a main memory, or other memory storage, and a storage unit 1716, both accessible to the processors 1704 such as via the bus 1702. The storage unit 1716 and memory 1714 store the instructions 1710 embodying any one or more of the methodologies or functions described herein. The instructions 1710 may also reside, completely or partially, within the memory 1714, within the storage unit 1716, within at least one of the processors 1704 (e.g., within the processor's cache memory), or any suitable combination thereof, during execution thereof by the machine 1700. Accordingly, the memory 1714, the storage unit 1716, and the memory of the processors 1704 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1718 may include a wide variety of components to provide a user interface for receiving input, providing output, producing output, transmitting information, exchanging information, capturing measurements, and so on. The specific I/O components 1718 that are included in the user interface of a particular machine 1700 will depend on the type of machine. For example, portable machines such as mobile phones will likely include a touch input device or other such input mechanisms, while a headless server machine will likely not include such a touch input device. It will be appreciated that the I/O components 1718 may include many other components that are not shown in FIG. 17. The I/O components 1718 are grouped according to functionality merely for simplifying the following discussion and the grouping is in no way limiting. In various exemplary embodiments, the I/O components 1718 may include output components 1726 and input components 1728. The output components 1726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1728 may also include one or more image-capturing devices, such as a digital camera for generating digital images and/or video.

In further exemplary embodiments, the I/O components 1718 may include biometric components 1730, motion components 1734, environment components 1736, or position components 1738, as well as a wide array of other components. For example, the biometric components 1730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1734 may include acceleration sensor components (e.g., accelerometer), gravitation sensor components, rotation sensor components (e.g., gyroscope), and so forth. The environment components 1736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1718 may include communication components 1740 operable to couple the machine 1700 to a network 1732 or devices 1720 via a coupling 1724 and a coupling 1722 respectively. For example, the communication components 1740 may include a network interface component or other suitable device to interface with the network 1732. In further examples, the communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1720 may be another machine or any of a wide variety of peripheral devices (e.g., a peripheral device coupled via a USB).

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1740, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

We claim:

1. A method comprising:
receiving, by a messaging client application in a first security domain, a request from a web-based application in a second security domain to display a video, wherein:
the first security domain restricts the web-based application in the second security domain from accessing user data associated with one or more users of the messaging client application;
the request comprises a plurality of criteria and a first amount of virtual currency;
accessing, by the messaging client application, the user data within the first security domain;
identifying, by the messaging client application, a video to be displayed in response to comparing the user data with the plurality of criteria included in the request;
accumulating a count value, associated with the video, representing a quantity of a plurality of user characteristics that match the plurality of criteria respectively;
obtaining a weight for an individual criterion of the plurality of criteria;
adjusting the count value based on the weight for the individual criterion that matches a respective user characteristic of the plurality of user characteristics;
determining, by the messaging client application, a subset of the first amount of virtual currency within the first security domain based on a robustness of user interactions with the video;
reporting the subset of the first amount of virtual currency from the messaging client application to the web-based application;
retrieving, by the messaging client application, user account data that comprises a second amount of virtual currency within the first security domain; and
adding, by the messaging client application, the subset of the first amount of virtual currency to the second amount of virtual currency of the user account data.

2. The method of claim 1, further comprising:
launching, by the messaging client application, the web-based application;

receiving, by the messaging client application, the request from the web-based application to display the video;

accumulating the count value, associated with the video, representing the quantity of the plurality of user characteristics that match the plurality of criteria respectively;

identifying the video for display by the messaging client application based on the count value; and determining a percentage of the video of which a user has watched less than an entirety.

3. The method of claim 1, further comprising:

determining, by a control component of the messaging client application, that a parameter of a request received by the messaging client application from the web-based application satisfies a predefined rule to display the video, wherein the video is identified in response to and conditioned upon the messaging client application determining that the parameter of the request received from the web-based application satisfies the predefined rule.

4. The method of claim 3, further comprising:

determining, by the messaging client application, that the request from the web-based application comprises performing a financial transaction by the messaging client application;

in response to determining that the request from the web-based application comprises performing the financial transaction by the messaging client application, causing a confirmation dialog to be displayed by the messaging client application prior to performing the financial transaction; and monitoring user interaction with the video to generate display results.

5. The method of claim 3, further comprising:

determining a first set of videos meeting one or more criteria indicated in the request;

comparing characteristics of a user to criterion associated with each of the first set of videos to determine a best matching user interface in the first set of videos for the user;

comparing a first user characteristic to a first criterion comprising a range of characteristics of a first video;

in response to determining that the first user characteristic is within the range of characteristics of the first video, incrementing a first count value associated with the first video, the first count value representing a first quantity of the characteristics of the user that match criteria of the first video;

after comparing the first user characteristic to the first criterion determining that a second user characteristic is available and comparing the second user characteristic to a second criterion of a second video in response;

in response to determining that the second user characteristic matches the second criterion, incrementing a second count value associated with the second video, the second count value representing a second quantity of the characteristics of the user that match criteria of the second video;

comparing the first count value with the second count value; and selecting the first video in response to determining that the first count value is greater than the second count value.

6. The method of claim 1, wherein the video is a first video, further comprising:

accumulating a first count value, associated with the first video, representing a quantity of a plurality of user characteristics that match the plurality of criteria respectively;

accumulating a second count value, associated with a second video, representing another quantity of the plurality of user characteristics that match an additional plurality of criteria respectively of the second video;

determining that the second count value is lower than the first count value;

determining that the first video associated with the first count value was previously displayed prior to a defined period of time elapsing; and in response to determining that the first video was previously displayed prior to a defined period of time elapsing, selecting the second video associated with the second count value that is lower than the first count value of the first video.

7. The method of claim 1, further comprising:

presenting in the video a nudge option; and in response to receiving input that selects the nudge option, transmitting a push notification to a select set of users to remind the select set of users to engage with the messaging client application.

8. The method of claim 1, further comprising:

monitoring user interaction with the video to generate display results, wherein one or more metrics associated with the monitored user interaction indicate that a user has shared the video with another user.

9. A system, comprising:

hardware processing circuitry; and a hardware memory storing instructions that when executed, configure the hardware processing circuitry to perform operations comprising:

receiving, by a messaging client application in a first security domain, a request from a web-based application in a second security domain to display a video, wherein:

the first security domain restricts the web-based application in the second security domain from accessing user data associated with one or more users of the messaging client application;

the request comprises a plurality of criteria and a first amount of virtual currency;

accessing, by the messaging client application, the user data within the first security domain;

identifying, by the messaging client application, a video to be displayed in response to comparing the user data with the plurality of criteria included in the request;

accumulating a count value, associated with the video, representing a quantity of a plurality of user characteristics that match the plurality of criteria respectively;

obtaining a weight for an individual criterion of the plurality of criteria;

adjusting the count value based on the weight for the individual criterion that matches a respective user characteristic of the plurality of user characteristics;

determining, by the messaging client application, a subset of the first amount of virtual currency within the first security domain based on a robustness of user interactions with the video;

reporting the subset of the first amount of virtual currency from the messaging client application to the web-based application;

retrieving, by the messaging client application, user account data that comprises a second amount of virtual currency within the first security domain; and adding, by the messaging client application, the subset of the first amount of virtual currency to the second amount of virtual currency of the user account data.

10. The system of claim 9, the operations comprising: providing a first reward in response to determining that a first robustness of the user interactions in which the user interactions were performed through an entire display of the video; and providing a second reward in response to determining that the user interactions were less robust than the first robustness, the user interactions being less robust than the first robustness in response to determining that the video was placed in a background for a portion of a time that the video was played.

11. The system of claim 9, the operations comprising: determining, by a control component of the messaging client application, that a parameter of a request received by the messaging client application from a web-based application satisfies a predefined rule to display the video, wherein the video is generated in response to and conditioned upon the messaging client application determining that the parameter of the request received from the web-based application satisfies the predefined rule.

12. The system of claim 11, wherein the web-based application executes within a first security domain and user data is retrieved via a second security domain, the operations comprising:

determining, by the messaging client application, that the request from the web-based application comprises performing a financial transaction by the messaging client application;

in response to determining that the request from the web-based application comprises performing the financial transaction by the messaging client application, causing a confirmation dialog to be displayed by the messaging client application prior to performing the financial transaction; and monitoring user interaction with the displayed video to generate display results.

13. The system of claim 11, the operations comprising presenting an option in a user interface to purchase a random item.

14. The system of claim 11, the operations comprising: determining a first set of videos meeting one or more criteria indicated in the request;

comparing characteristics of a user to criterion associated with each of the first set of videos to determine a best matching user interface in the first set of videos for the user;

comparing a first user characteristic to a first criterion comprising a range of characteristics of a first video;

in response to determining that the first user characteristic is within the range of characteristics of the first video, incrementing a first count value associated with the first video, the first count value representing a first quantity of the characteristics of the user that match criteria of the first video;

comparing a second user characteristic to a second criterion of a second video;

in response to determining that the second user characteristic matches the second criterion, incrementing a second count value associated with the second video, the second count value representing a second quantity of the characteristics of the user that match criteria of the second video;

comparing the first count value with the second count value; and selecting the first video in response to determining that the first count value is greater than the second count value.

15. The system of claim 14, wherein the web-based application executes HTML 5 instructions to implement the web-based application, and wherein the first user characteristic comprises age of the user, further comprising determining whether additional user characteristics remain to be evaluated against the criteria associated with the first and second user interfaces.

16. The system of claim 11, wherein the virtual currency is used to purchase virtual or real goods.

17. The system of claim 9, the operations comprising: determining the robustness based on whether the user interactions comprise replaying the video.

18. A non-transitory computer readable storage medium comprising instructions that when executed configure hardware processing circuitry to perform operations comprising:

receiving, by a messaging client application in a first security domain, a request from a web-based application in a second security domain to display a video, wherein:

the first security domain restricts the web-based application in the second security domain from accessing user data associated with one or more users of the messaging client application;

the request comprises a plurality of criteria and a first amount of virtual currency;

accessing, by the messaging client application, the user data within the first security domain;

identifying, by the messaging client application, a video to be displayed in response to comparing the user data with the plurality of criteria included in the request;

accumulating a count value, associated with the video, representing a quantity of a plurality of user characteristics that match the plurality of criteria respectively;

obtaining a weight for an individual criterion of the plurality of criteria;

adjusting the count value based on the weight for the individual criterion that matches a respective user characteristic of the plurality of user characteristics;

determining, by the messaging client application, a subset of the first amount of virtual currency within the first security domain based on a robustness of user interactions with the video;

reporting the subset of the first amount of virtual currency from the messaging client application to the web-based application;

retrieving, by the messaging client application, user account data that comprises a second amount of virtual currency within the first security domain; and adding, by the messaging client application, the subset of the first amount of virtual currency to the second amount of virtual currency of the user account data.

19. The non-transitory computer readable storage medium of claim 18, the operations comprising:

determining the robustness based on whether the user interactions comprise sharing the video with one or more other users or marking the video as a favorite.

* * * * *